United States Patent [19]
Sawada

[11] Patent Number: 5,859,747
[45] Date of Patent: Jan. 12, 1999

[54] COVER STRUCTURE FOR MAGNETIC RECORDING AND REPRODUCING DEVICE

[75] Inventor: Toru Sawada, Fukushima-ken, Japan

[73] Assignee: Alps Electric Co., Ltd., Tokyo, Japan

[21] Appl. No.: 907,573

[22] Filed: Aug. 7, 1997

Related U.S. Application Data

[62] Division of Ser. No. 710,223, Sep. 13, 1996, Pat. No. 5,748,404.

[30] Foreign Application Priority Data

Sep. 18, 1995 [JP] Japan .................................. 7-238797
Sep. 26, 1995 [JP] Japan .................................. 7-247925

[51] Int. Cl.⁶ .................................................. G11B 33/12
[52] U.S. Cl. ........................ 360/99.01; 360/106; 360/137
[58] Field of Search .............................. 360/97.01–98.01, 360/99.01, 106, 108, 137

[56] References Cited

U.S. PATENT DOCUMENTS

| | | | |
|---|---|---|---|
| Re. 35,713 | 1/1998 | Kobayashi | 360/97.01 |
| 4,519,016 | 5/1985 | Bradley et al. | 361/415 |
| 4,558,398 | 12/1985 | Drake | 361/415 |
| 4,672,510 | 6/1987 | Castner | 361/415 |
| 4,758,928 | 7/1988 | Wierec et al. | 361/415 |
| 4,821,150 | 4/1989 | Duthie et al. | 361/395 |
| 5,124,888 | 6/1992 | Suzuki et al. | 361/395 |
| 5,136,466 | 8/1992 | Remise et al. | 361/391 |
| 5,216,582 | 6/1993 | Russell et al. | 361/395 |
| 5,235,482 | 8/1993 | Schmitz | 360/97.02 |
| 5,262,923 | 11/1993 | Batta et al. | 361/685 |
| 5,282,099 | 1/1994 | Kawagoe et al. | 360/97.01 |
| 5,329,412 | 7/1994 | Stefansky | 360/97.01 |
| 5,379,171 | 1/1995 | Morehouse et al. | 360/97.01 |
| 5,392,175 | 2/1995 | Beecroft | 360/97.01 |
| 5,394,305 | 2/1995 | Moral et al. | 361/776 |
| 5,459,808 | 10/1995 | Keith | 385/135 |
| 5,502,604 | 3/1996 | Furay | 360/97.01 |
| 5,532,889 | 7/1996 | Stefansky et al. | 360/97.01 |
| 5,551,145 | 9/1996 | Jurgenson | 360/97.01 |
| 5,587,856 | 12/1996 | Aoyama | 360/99.02 |
| 5,600,513 | 2/1997 | Nakata et al. | 360/99.08 |
| 5,610,782 | 3/1997 | Tomoe et al. | 360/99.04 |
| 5,623,381 | 4/1997 | Sawada et al. | 360/97.01 |
| 5,633,768 | 5/1997 | Watanabe | 360/99.01 |
| 5,636,091 | 6/1997 | Asano | 360/106 |
| 5,654,847 | 8/1997 | Yagi et al. | 360/97.02 |
| 5,748,404 | 5/1998 | Sawada | 360/99.01 |

FOREIGN PATENT DOCUMENTS 5-325528  12/1993  Japan .

Primary Examiner—Jefferson Evans
Attorney, Agent, or Firm—Brinks Hofer Gilson & Lione

[57] ABSTRACT

A magnetic recording/reproducing device including a top cover having a plurality of leg portions 1e with cutouts that project from each side face of the top cover such that the location of a leg portion at one side face does not correspond to the location of a leg portion at the other side face; and a bottom cover having a plurality of retaining portions 2e in correspondence with the leg portions 1e at each side face of the lower cover formed by bending portions of the side faces. The top cover and the bottom cover are integrally engaged together by fitting the retaining portions into the cutouts of their corresponding leg portions. A plurality of top covers are successively press-cut from a metal plate such that a leg portion of a particular top cover is positioned between the leg portions of another top cover that is adjacent to the particular top cover, thus reducing the amount of scraps produced from the metal plate. Accordingly, the invention makes it possible to produce a magnetic recording/reproducing device at a lower cost.

2 Claims, 27 Drawing Sheets

COVER STRUCTURE FOR MAGNETIC RECORDING AND REPRODUCING DEVICE

This application is a division of application Ser. No. 08/710,223 filed Sep. 13, 1996, now U.S. Pat. No. 5,748,404.

BACKGROUND OF THE INVENTION

1. Field of the Invention

The present invention relates to a magnetic recording/reproducing device, and, more particularly, to a magnetic recording/reproducing device in which a mechanism body, including the chassis, is covered with a pair of top and bottom covers.

2. Description of the Related Art

In a magnetic recording/reproducing device for recording information onto or reproducing information from a magnetic disk incorporated in a disk cartridge, the mechanism body, formed into a unitary structure based on the chassis, is interposed between the top cover and bottom cover and integrally engaged therewith, whereby the mechanism body is covered by both the upper and bottom covers.

FIGS. 50 and 51 each illustrate a conventional example of such a magnetic recording/reproducing device. Referring to the figures, the top cover 100 has a flat top face 100a and a pair of side faces 100b that extend vertically downward from the side edges of the top face 100a. The side faces 100b are formed by bending portions of the top cover 100 vertically with respect to the top face 100a. Two leg portions 100c project downwardly from a lower end of one of the side faces 100b, with horizontally extending slits 100d formed in the leg portions 100c. In the same way, two leg portions 100c with slits 100d are formed at the lower end of the other side face 100b. The leg portions are formed on corresponding locations on the left and right side faces.

The bottom cover 101 has a flat bottom face 101a, and a pair of side faces 101b extending upright from both edges of the bottom face 101a. The side faces 101b are formed by bending portions of the bottom cover 101 vertically with respect to the bottom face 101a. Each of the side faces 101b has a pair of retainer portions 101c, which are formed in corresponding locations. The retainer portions 101c are formed by bending portions along horizontal lines of the side faces 101b inwardly and vertically with respect to the side faces 101b. Through holes 101d are formed in the retainer portions 101c.

The chassis 102 has a flat bottom face 102a, and a pair of side faces 102b extending upright from the side edges of the bottom face 102a. A screw receiving portion 102c is formed in an upper end of one of the side faces 102b. The mechanism body, including the loading mechanism and means for moving the head (not shown), is placed on the chassis 102. The mechanism body is formed into a unitary structure based on the chassis 102. A printed board (not shown) is fixed to the lower surface of the chassis 102, and has mounted thereon circuits for driving the mechanism body and a connector.

The top cover 100 and the bottom cover 101, and the chassis 102 are formed by punching out predetermined shapes from a metal blank sheet such as an iron plate, and bending the punched shapes.

In assembling the magnetic recording/reproducing device, the chassis 102 is placed on the retainer portions 101 of the bottom cover 101, and a screw 104 is inserted from the bottom face 101a side through each through hole 101d and screwed into the chassis 102, so as to fix the chassis 102 of the mechanism body within the bottom cover 101. Then, the top cover 100 is placed over the bottom cover 101 and moved horizontally in order to fit the retainer portions 101c into their corresponding slits 100d in the leg portions 100c, as a result of which the top cover 100 is retained by the bottom cover 101. A different screw 105 is then screwed from the outside of the top face 100a into a screw receiving portion 102c in order to fix the top cover 100 to the chassis 102. As a result, the top cover 100 and the bottom cover 101 are integrally engaged with each other via the chassis 102, so as to accommodate the mechanism body therein. In this case, a connector mounted onto the printed board is disposed inside an opening formed in a rear end where the upper and bottom covers 100 and 101 engage each other. In addition, the magnetic recording/reproducing device, while being incorporated in an external device of a computer body or the like, is electrically connected to the external device by inserting the external connector of the external device from the opening at the rear end where the covers engage each other, and connecting it to the connector on the printed board.

In the above-described conventional magnetic recording/reproducing device, however, the leg portions 100c of the top cover 100 are formed in corresponding positions on each side face 100b, so that when a plurality of top covers 100 are successively press-cut from the same metal blank sheet, the sides 100b of two adjacent top covers 100 must be separated by a distance greater than the total sum of the lengths of the leg portion 100c of one of the top cover 100 and its adjacent top cover 100, thus resulting in material wastage that prevents cost reduction.

In addition, since the top cover 100 is retained by the bottom cover 101 by fitting the retainer portion 100c into the slit 100d in the leg portion 100c in the direction of plate thickness of the retainer portion 101c, it becomes difficult to fit the retainer portion 101c into the slit 100d, unless the retainer portion 101c is accurately positioned with respect to its corresponding slit 100d along the vertical dimension. However, the height of the retainer portion 101c depends on the degree of its perpendicularity with respect to the side face of the bottom cover 101, so that unless the retainer portion 101c is made perpendicular to the side face, many processing difficulties result. Further, variations in the height of the retainer portions 101 occur easily, resulting in the problem that the chassis tilts when placed on the retainer portions 101c.

In addition, the bottom cover 101 and the chassis 102 are fixed to each other with a plurality of screws 104, and the top cover 100 and the chassis 102 are fixed to each other by a different screw 105, so that a larger number of screws must be screwed, which prevents cost reduction.

In the above-described conventional magnetic recording/reproducing device, the mechanism, formed into a unitary structure, and the printed board are covered by a pair of covers from above and below the mechanism and the printed board, resulting in the problems that the overall weight of the device and material costs cannot be reduced due to the use of two covers. In addition, upon integral engagement of both covers, the mounting position of the stepping motor, being the driving source for the mechanism for moving the head, is sometimes slightly adjusted. However, since the stepping motor is disposed inside an opening at the rear end where both covers engage each other, the adjustment is troublesome to carry out.

To overcome such problems, the front-to-back side dimension of the top cover is be made shorter than that of the bottom cover in order to expose the connector and the stepping motor through the top cover. In this case, the top cover does not have to cover the connector and the stepping motor, thus reducing material costs for the top cover by an amount corresponding to the reduced dimension, and allowing adjustment of the stepping motor to be performed more simply in a larger space. However, since the region around the connector is open space, there is no longer a positioning standard for inserting an external connector to the connector, so that it becomes troublesome to connect the external connector to the connector.

SUMMARY OF THE INVENTION

Accordingly, in order to overcome the above-described problems, a first object of the present invention is to provide a magnetic recording/reproducing device which can be produced at a lower cost by reducing the amount of scraps produced when press-cutting the upper or bottom covers from the base sheet.

A second object of the present invention is to provide a magnetic recording/reproducing device in which the top cover and the bottom cover can be easily formed into a integral structure.

A third object of the present invention is to provide a magnetic recording/reproducing device in which the chassis can be made to accurately engage the bottom cover.

A fourth object of the present invention is to provide a magnetic recording/reproducing device in which the top cover, the bottom cover, and the chassis can be secured together using only one screw.

A fifth object of the present invention is to provide a magnetic recording/reproducing device lighter in weight and capable of being produced using a smaller amount of material, in which the external connector can be easily connected to the connector.

According to the present invention, when the leg portions that project from the side faces of the top cover or bottom cover are press-cut from a metal blank sheet, a leg portion of a face of a particular cover is positioned between the leg portions of an adjacent side face of a different cover, so that the portion of the blank sheet between the leg portions that is usually thrown away as scraps can be used to form a leg portion of another upper or bottom cover, thus reducing material wastage.

In addition, according to the present invention, the retainer portions, formed by bending portions of the side faces inwardly along vertical lines, are clamped vertically between the sides defining the cutouts formed in the leg portions, so as to accurately maintain the positions of the retainer portions relative to their respective cutouts, regardless of the bending angle of the retainer portions.

Further, according to the present invention, a set of a supporting portion and a stopper portion, formed within a region of an opening in a side face by press-cutting, are formed by inwardly bending a portion of the side face along a vertical line, so that variations in the relative position of the supporting portion and the stopper portion in a set can be minimized, resulting in accurate connection of the bottom cover and the chassis.

Further, according to the present invention, the top cover, bottom cover, and the chassis are placed upon each other, and are brought into engagement at one location, using one screw which is screwed tightly at the location of engagement, thus reducing the number of required component parts, and manhour.

Further, according to the present invention, when a pair of upper and bottom covers are in integral engagement with each other, a large portion of the mechanism body and the printed board are covered by both of the covers, but the connector mounted on the printed board is disposed at an open area located upwardly of the rear end of the bottom cover, so that the connector is not covered by the top cover. In addition, an external connector can be easily connected to the connector, because the amount of horizontal shifting of the external connector is limited by a limiting wall formed at a rear end of the bottom cover.

Further, when the motor, being a driving source for the mechanism for moving the head, is exposed, along with the connector, through the opening located upwardly of the rear end of the bottom cover, motor adjustment can be performed very easily. In addition, a plurality of limiting walls formed at the rear end of the bottom cover, in correspondence with each side of the connector, further prevents horizontal shifting of the external connector.

DESCRIPTION OF THE PREFERRED EMBODIMENTS

Figure 1:
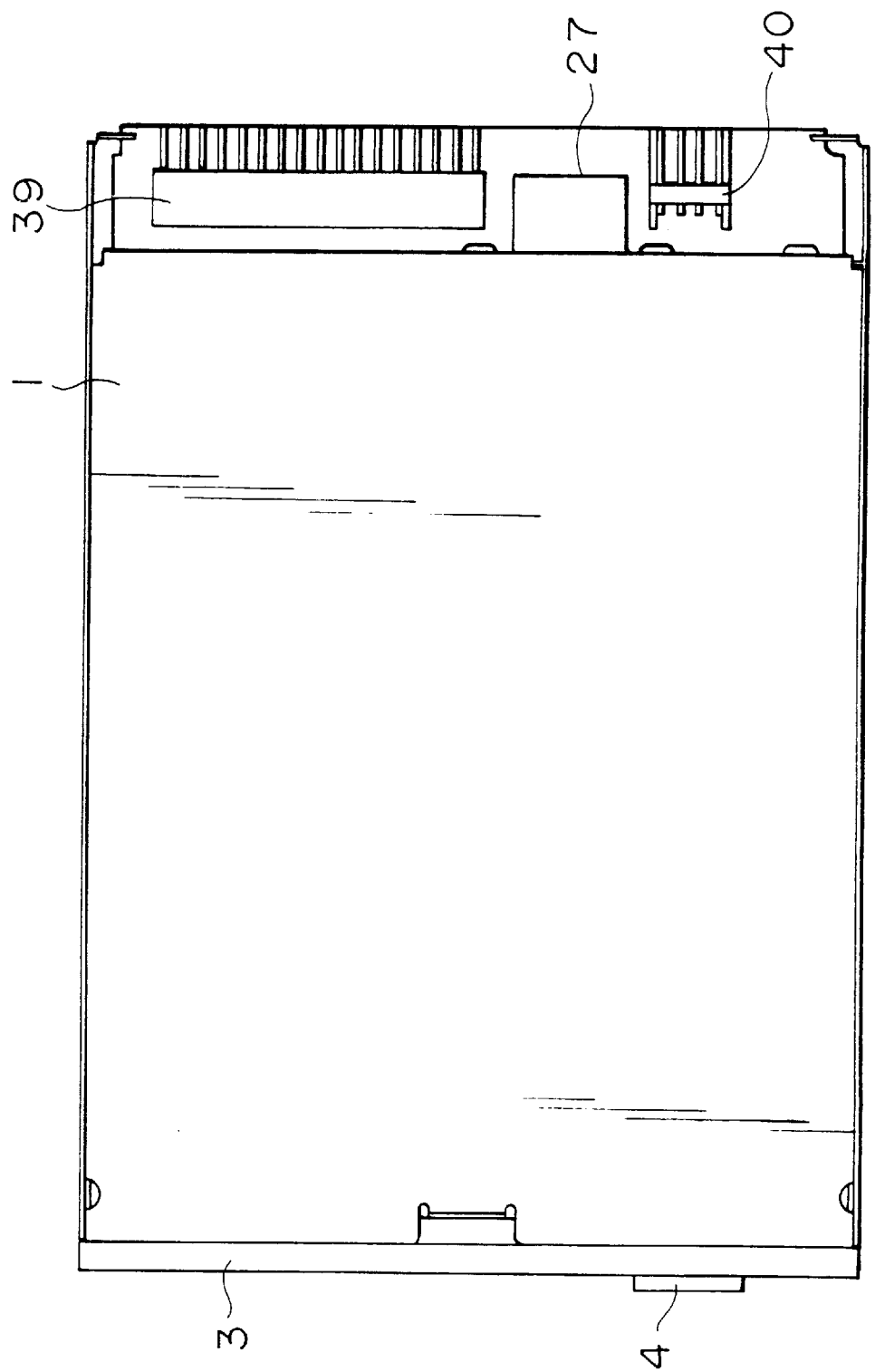
FIG. 1 is a plan view of an embodiment of a magnetic recording/reproducing device in accordance with the present invention.
Figure 2:
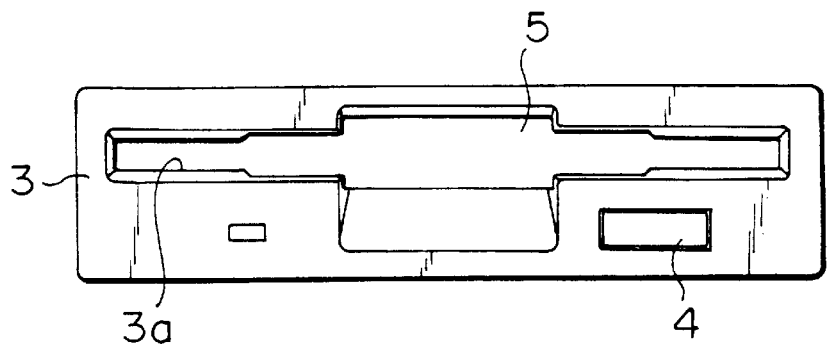
FIG. 2 is a front elevational view of the magnetic recording/reproducing device.
Figure 3:
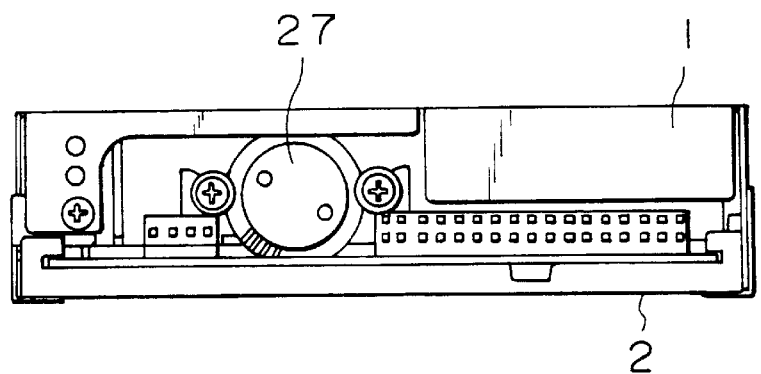
FIG. 3 is a rear elevational view of the magnetic recording/reproducing device.
Figure 4:
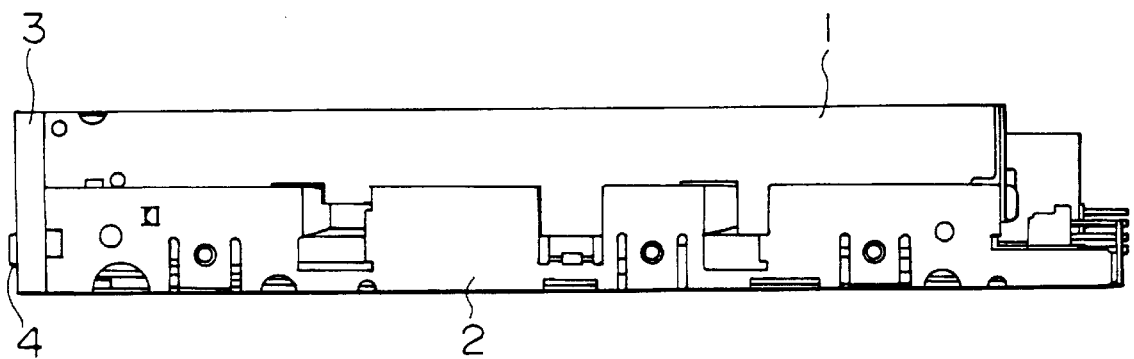
FIG. 4 is a side elevational view of the magnetic recording/reproducing device.

A description will now be given of the preferred embodiments of the present invention, with reference to the figures.

Referring to FIGS. 1 to 4, the magnetic recording/reproducing device of the present embodiment comprises an top cover 1 and a bottom cover 2, a mechanism body, and a front plate 3. The top cover 1 engages the bottom cover 2 into an integral structure to form a housing. The mechanism body is accommodated within the top cover 1 and the bottom cover 2. The front plate 3 is mounted to an opening formed forwardly of the top cover 1 and the bottom cover 2. An opening 3a, being long sideways, is formed in the front plate 3. In addition, an eject button 4 (described later), capable of moving in and out, is provided at the front plate 3. Further, a door 5 is rotatably supported at the back side of the front plate 3. The door 5 is urged by means of a torsion spring (not shown) in the direction the opening 3a is closed.

Figure 5:
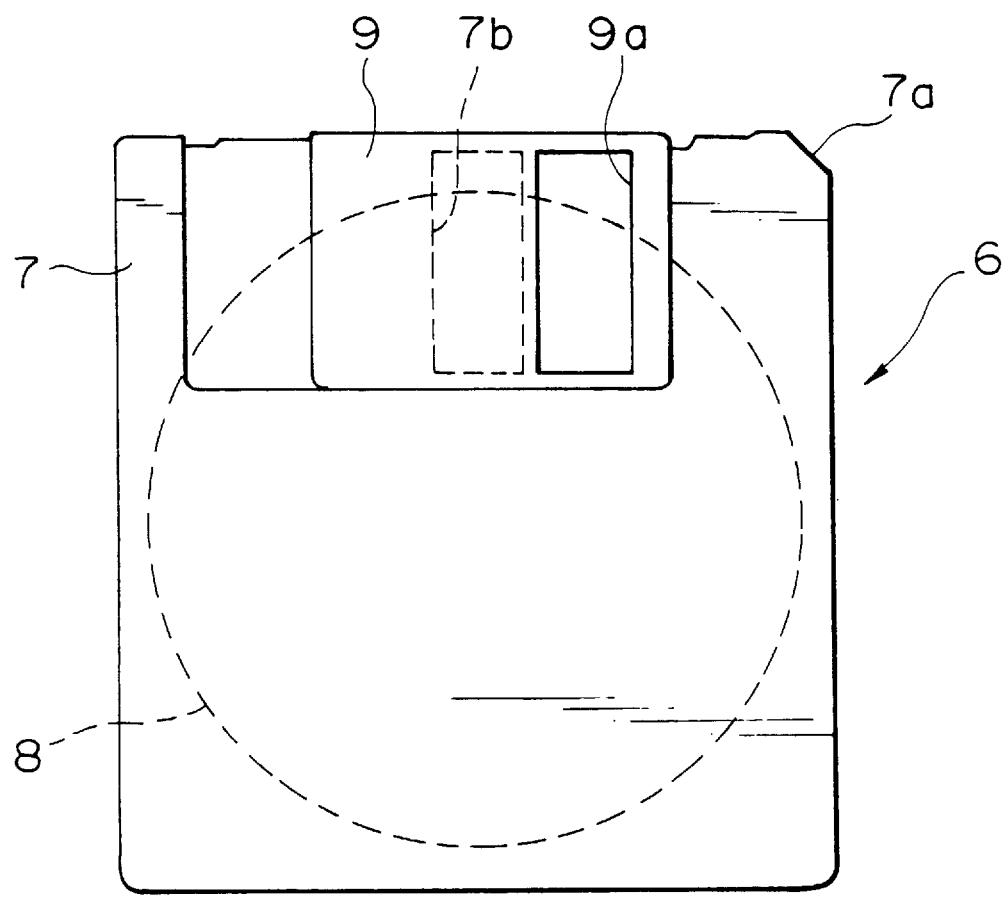
FIG. 5 is a plan view of a disk cartridge.

The disk cartridge 6 used in the aforementioned magnetic recording/reproducing device is a conventionally known disk cartridge. Referring to FIG. 5, the disk cartridge 6 comprises a cartridge case 7, a magnetic disk 8, and a shutter 9. The cartridge case 7 is composed of hard plastic material. The magnetic disk 8 is rotatably accommodated in the cartridge 7. The shutter 9 is capable of reciprocating movement along an edge of one side of the cartridge case 7. A corner of the cartridge case 7 is cut off so as to form a tapering edge, as a result of which an erroneous insertion prevention portion 7a is formed for preventing erroneous insertion of a disk cartridge. The shutter 9 is a folded C-shaped member, which has rectangular window openings 9a formed on both sides thereof. The cartridge case 7 also has openings 7b, corresponding to the window openings 9a. The shutter 9 is urged by means of a spring (not shown) in the direction the openings 7b are closed. When the disk cartridge 6 is inserted into the opening 3a in the front plate 3, a mechanism for opening and closing the shutter (described later) causes the openings 7b and the their respective window openings 9a to be aligned with each other, resulting in exposure of a magnetic disk 8 through the openings 7b and the window openings 9a.

As illustrated in FIGS. 6 to 9, the aforementioned mechanism body comprises the chassis 10, the slide plate 11, and the holder 12. The chassis 10 is secured to the upper surface of the bottom cover 2, the slide plate 11 is placed on the chassis 10 such that it can move back and forth, and the holder 12 is held by the slide plate 11. A detailed description will now be given below of the constructions of the chassis 10, the slide plate 11, and the holder 12.

Figure 10:
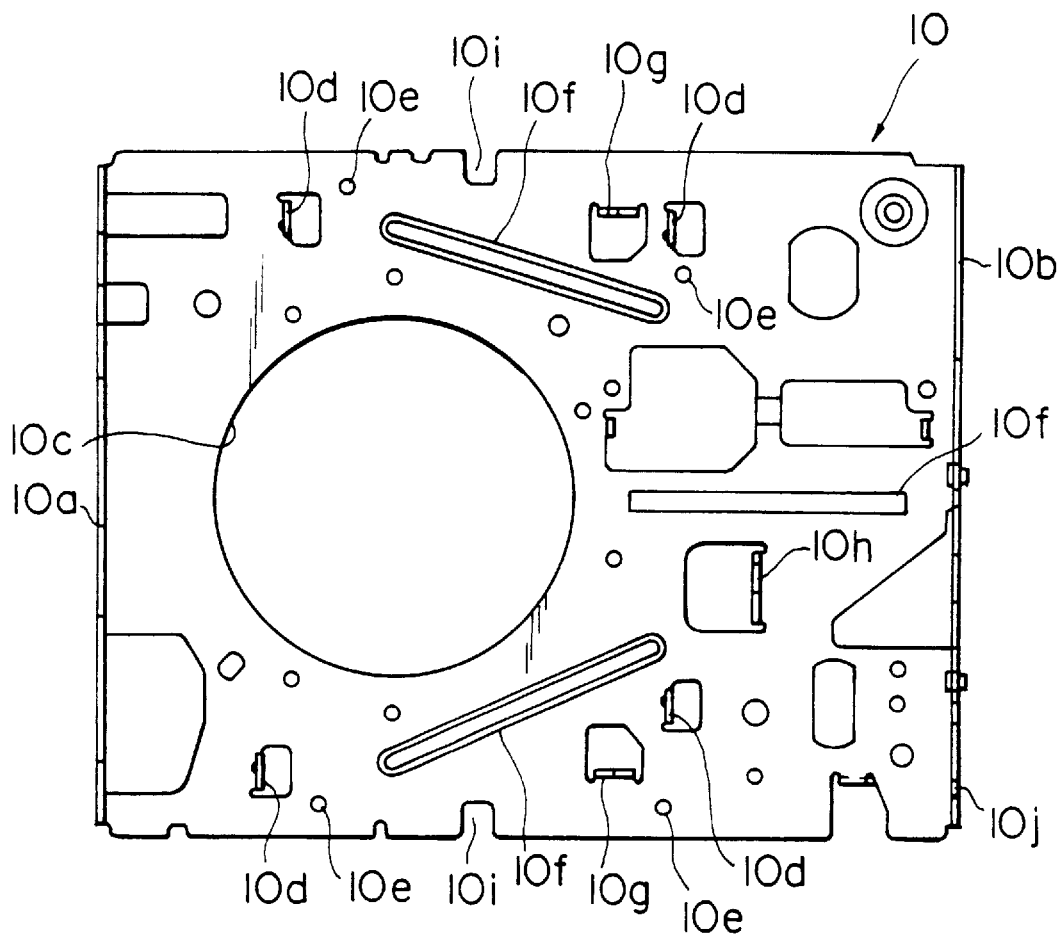
FIG. 10 is a plan view of the chassis provided in the magnetic recording/reproducing device.
Figure 11:
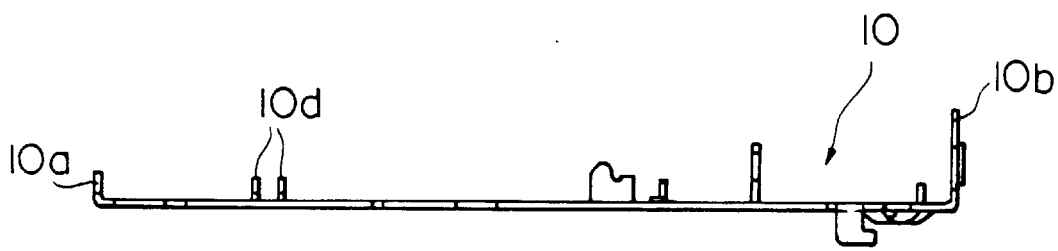
FIG. 11 is a side elevational view of the chassis.
Figure 12:
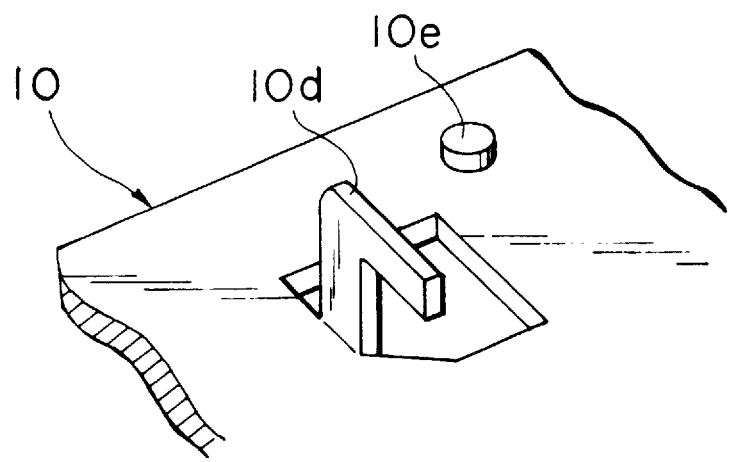
FIG. 12 is a perspective view of the guide projection and the protruding portion of the chassis.

The chassis 10 is an iron plate, being the base sheet, coated with zinc on both sides thereof. As illustrated in FIGS. 10 to 12, the chassis 10 has upright walls 10a and 10b formed on the front and back ends of the chassis by bending portions of the iron plate. A circular hole 10c is formed near the front upright wall 10a. A plurality of L-shaped guide projections 10d are formed around the circular hole 10c by vertically bending a portion of the bottom face of the chassis 10. Two guide projections 10d are formed on each side of the chassis 10, so that a total of four projections 10d are formed on the left and right sides of the chassis 10. A plurality of projections 10e that extend upward are formed at the bottom face of the chassis 10 and near the guide projections 10d, preferably within 10 mm therefrom. The projections 10e are formed by pressing the chassis in the direction of thickness of the plate. Since the both sides of the chassis 10 are previously coated with zinc, the flat surfaces of the projections 10e are also coated with zinc. In addition, a plurality of reinforcing ribs 10f, two stopper projections 10g, and a supporting wall 10h are formed at the bottom face of the chassis 10 by bending portions of the bottom face. The two stopper projections 10g define the position where the disk cartridge 6 is to be lowered, and the supporting wall 10h is separated from the back upright wall 10b by a predetermined distance in opposing relationship thereto. Further, notches 10i are formed in the left and right sides of the chassis 10, with a tapped hole 10j formed in the back upright wall 10b.

Figure 9:
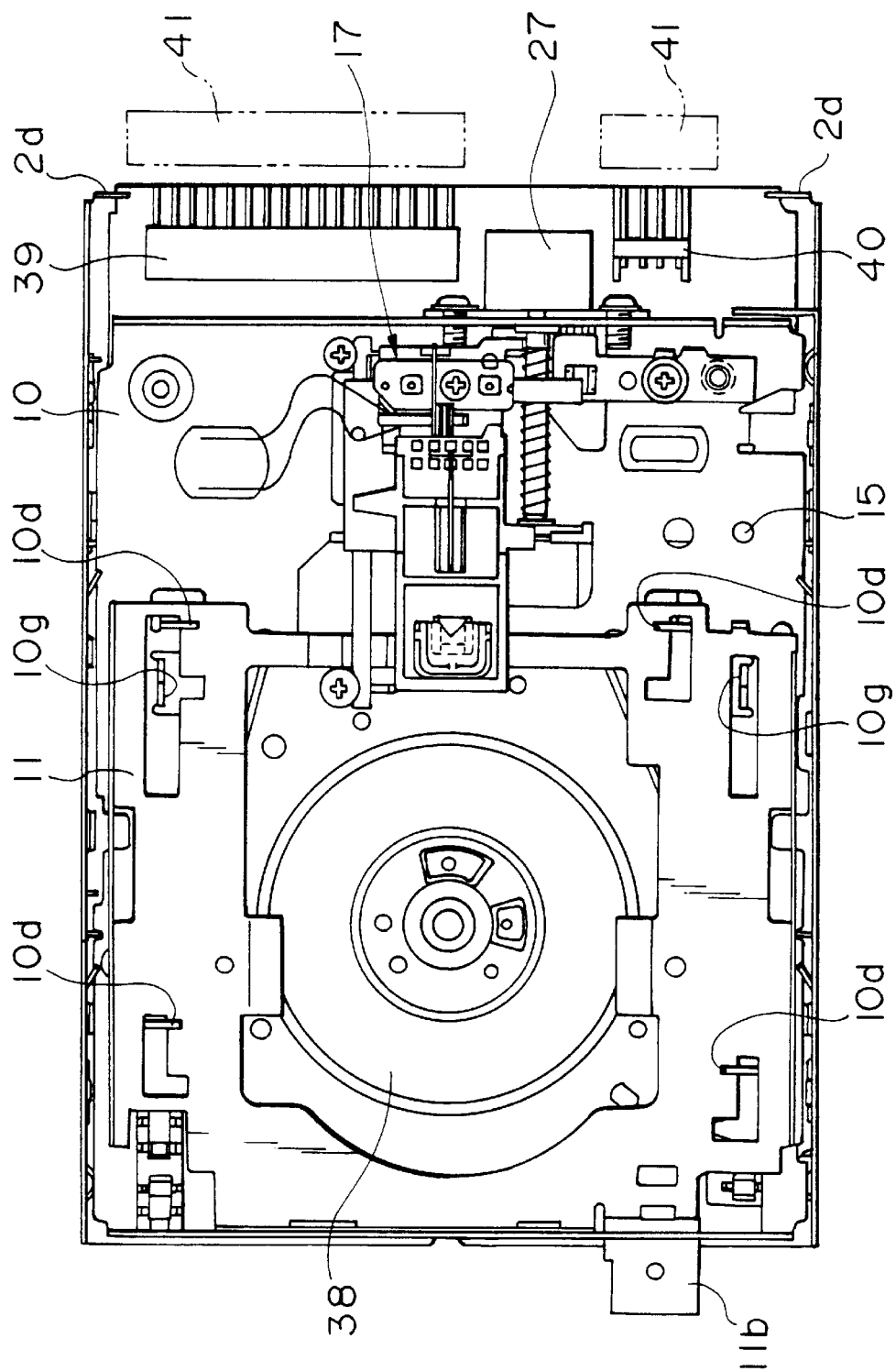
FIG. 9 is a plan view of FIG. 6 without the holder.
Figure 13:
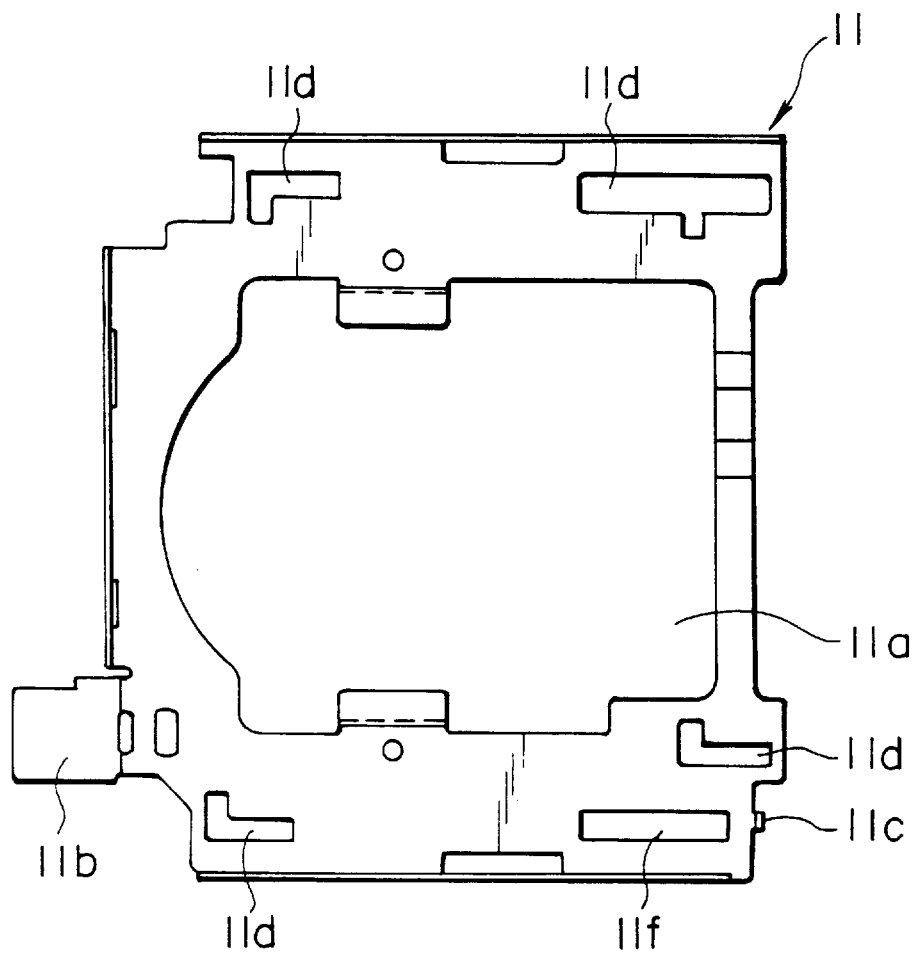
FIG. 13 is a plan view of the slide plate provided in the magnetic recording/reproducing device.
Figure 14:
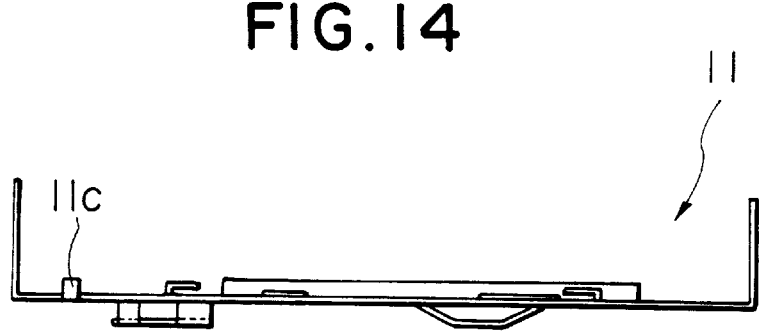
FIG. 14 is a rear elevational view of the slide plate.
Figure 15:
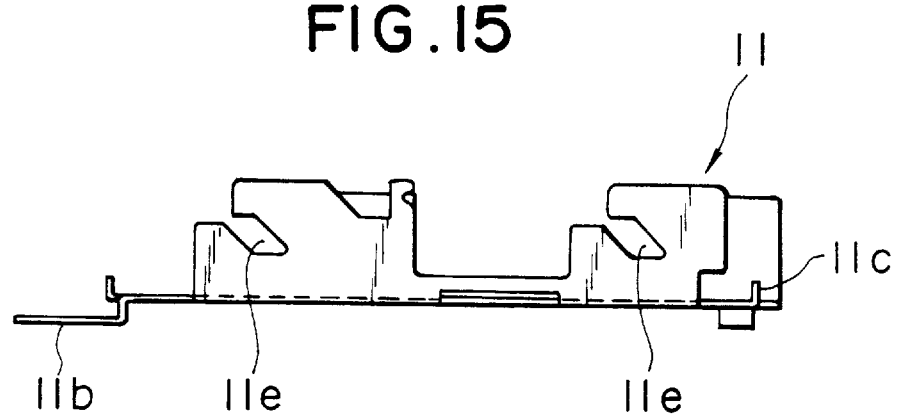
FIG. 15 is a side elevational view of the slide plate.
Figure 16:
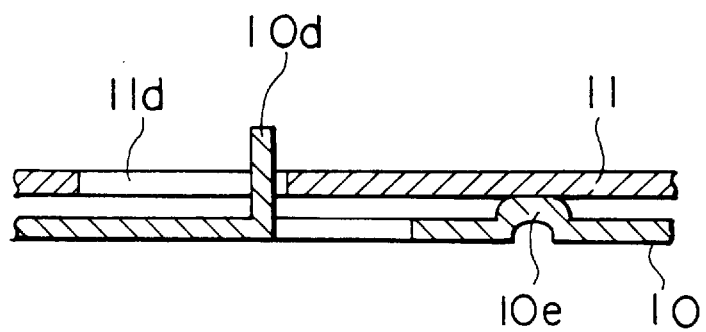
FIG. 16 is a cross sectional view of the slide plate and the chassis in an engaged state.

Like the chassis 10, the slide plate 11 is an iron plate, being the base sheet, coated with zinc on both sides thereof. As illustrated in FIGS. 13 to 15, the slide plate 11 is formed by bending a cross section of the iron plate into a U shape, with an opening 11a formed in the central portion of the bottom face thereof. A mounting portion 11b and a retainer pawl 11c are formed at the front and back ends of the slide plate 11 by bending portions of the plate. The mounting portion 11b is formed such that the aforementioned eject button 4 can be mounted thereto. In addition, a plurality of guide holes 11d and a projection receiving hole 11f are formed in the bottom face of the slide plate 11. Further, two cam grooves 11e each are formed in the left and right sides of the slide plate 11, so that a total of four cam grooves are formed therein. As illustrated in FIG. 9, when the slide plate 11 is placed on the chassis 10, the guide projections 10d and one of the stopper projections 10g are inserted into the guide holes 11d, while the other stopper projection 10g is inserted into the projection receiving hole 11f. The chassis 10 is only allowed to move back and forth, since the guide projections 10d restrict upward and downward movement as well as the back and forth movement of their corresponding guide holes 11d. In this case, the lower surface of the slide plate 11 slides along the upper surfaces of the projections 10e formed on the chassis 10. The slide plate 11 can slide smoothly along the chassis 10, because the lower surface of the slide plate 11 and the upper surfaces of the projections 10e are both coated with zinc.

Figure 17:
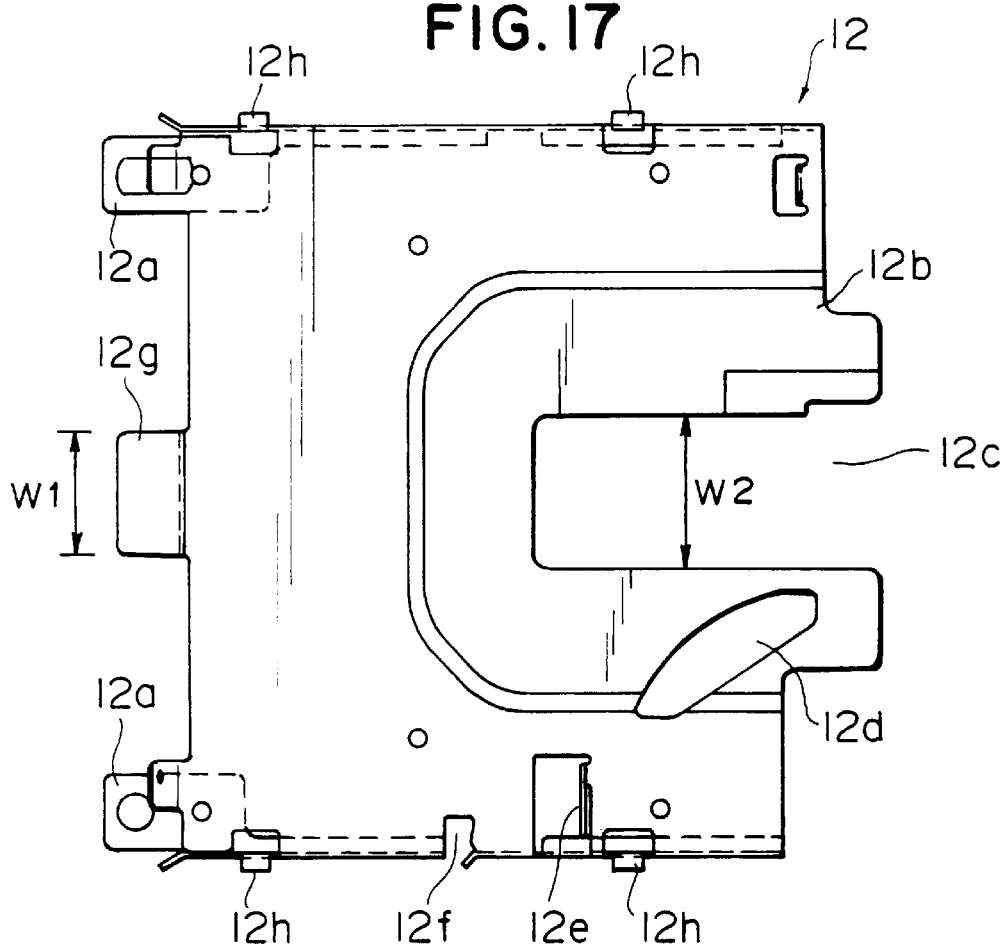
FIG. 17 is a plan view of the holder provided in the magnetic recording/reproducing device.
Figure 18:
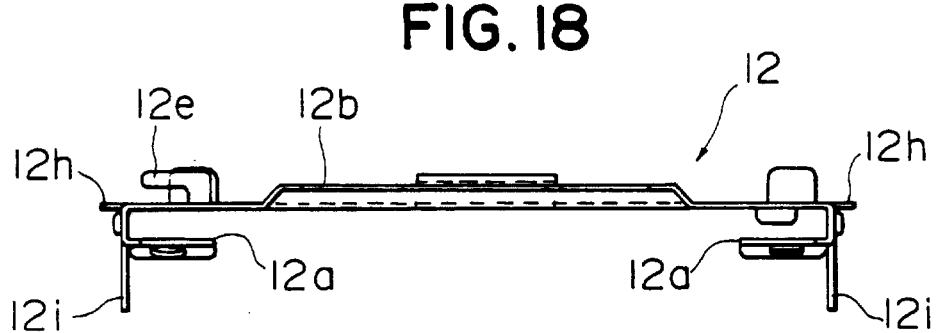
FIG. 18 is a rear elevational view of the holder.
Figure 19:
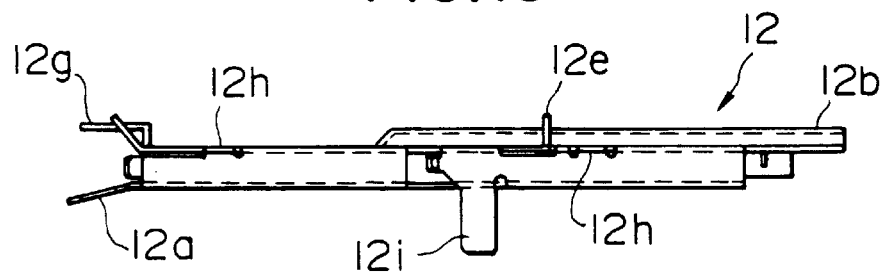
FIG. 19 is a side elevational view of the holder.

Like the chassis 10 and the slide plate 11, the holder 12 is also an iron plate, being the base sheet, coated with zinc on both sides thereof. As illustrated in FIGS. 17 to 19, the holder 12 is formed by bending a cross section of the plate into an inverted U shape. A supporting portions 12a are formed, as a result of bending portions of the iron plate, at the lower end at each side face of the holder 12, so as to oppose the upper surface at a predetermined interval therefrom. A bulging portion 12b that bulges slightly upward is formed on the upper surface of the holder 12, with a planar slot 12c, extending toward the rear end, and an arc-shaped clearance hole 12d formed at the bulging portion 12b. A projection 12e and a retainer hole 12f are formed near the bulging portion 12b, with the projection 12e formed by bending a portion of the holder. In addition, a planar stopper projection 12g is formed at the front end of the upper surface of the holder 12, with the width W1 of the stopper projection 12g being less than or equal to the width W2 of the slot 12c (W1≦W2). Further, two projections 12h each are formed on the left and right sides of the holder 12, so that a total of four projections are formed. The holder 12 also has downwardly, vertically extending portions 12i that extend vertically downward.

Figure 20:
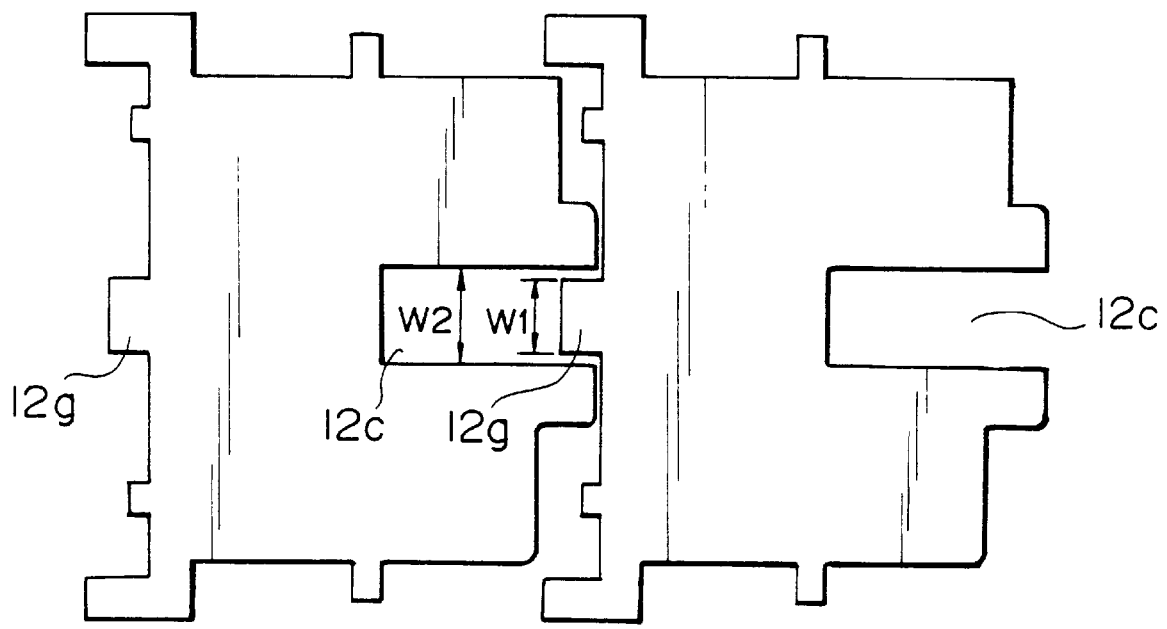
FIG. 20 is illustrative of the shapes of the holders press-cut from base sheet.

As illustrated in FIG. 20, the holder 12 is formed by pressing and punching out the shapes of the holders from a blank sheet, being an iron plate coated with zinc, and bending the punched shapes to form the holders. The width W1 of the stopper projection 12g is less than or equal to the width W2 of the slot 12c, so that it is possible to minimize the amount of base sheet scraps by punching out the shapes of the holders such that the stopper projection 12g to be punched out of a particular holder is positioned within a slot 12c of another holder adjacent to the particular holder. Conventionally, the portion of the base sheet remaining after the slot 12c has been punched out is thrown away as scraps of the base sheet. In this case, however, the remaining portion is used to form the stopper protrusion 12g of a different holder 12, thereby reducing the amount of wasted base sheet.

Referring back to FIGS. 6 to 9, the holder 12 is inserted between the sides of the slide plate 11. A tension spring 13 is provided between the upper surface of the holder 12 and a side surface of the slide plate 11. The vertically, downwardly extending portions 12i of the holder 12 pass through the bottom face of the slide plate 11 in order to be inserted into the notches 10i in the chassis 10. Engagement of the vertically, downwardly extending portions 12i and the notches 10i restricts the movement of the holder 12 so as to allow it to move only vertically with respect to the chassis 10. As described above, the slider plate 11 can only move back and forth along the chassis, so that the slider plate 11 is urged toward the front end of the chassis 10 by the tension spring 13. In addition, a rotating member 14 is disposed backwardly of the slide plate 11 and the holder 12. The member 14 is rotatably supported by a supporting shaft 15 attached to the chassis 10, and is urged counterclockwise (as viewed in FIG. 6) by a torsion spring 16.

Figure 21:
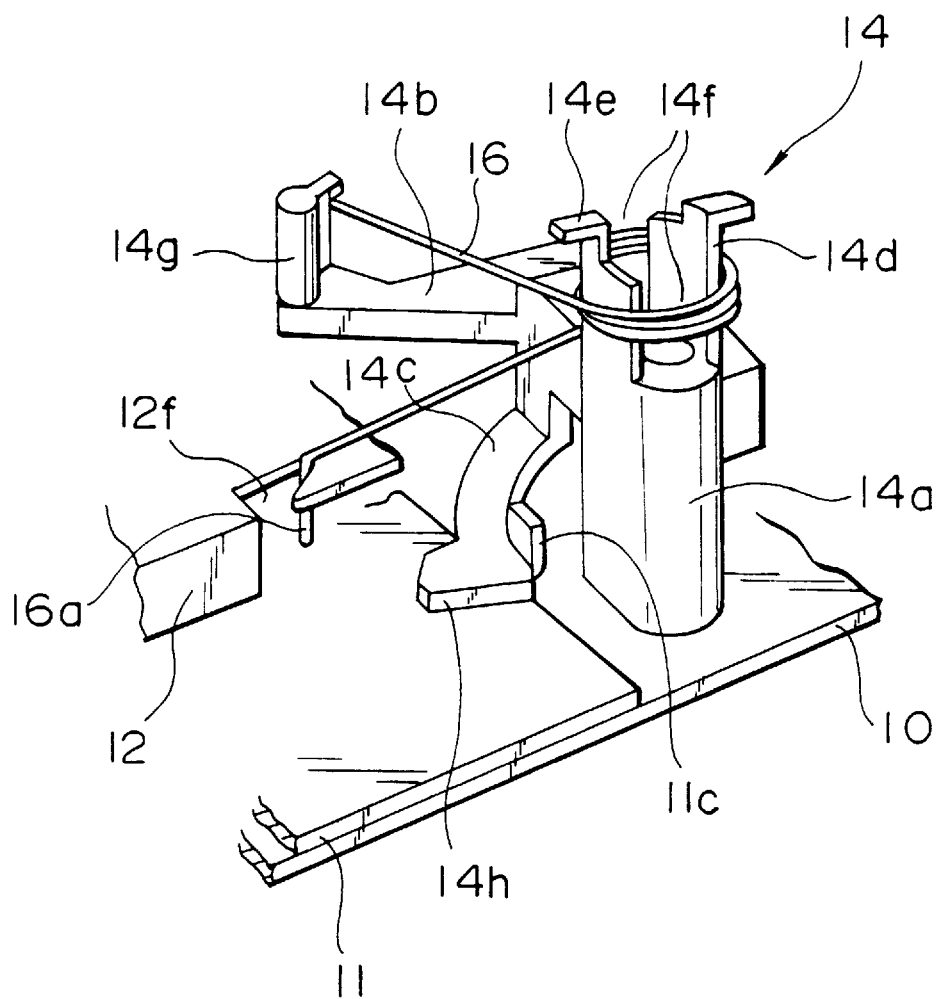
FIG. 21 is a perspective view of a critical portion of a mechanism for opening and closing a shutter provided in the magnetic recording/reproducing device.

The rotating member 14 is molded from a plastic, and, as shown in FIG. 21, comprises a cylindrical shaft portion 14a, and a pair of arms 14b and 14c. The shaft portion 14a is inserted into the supporting shaft 15, while the arms 14b and 14c project sideways from the shaft portion 14a. A pair of hook-shaped supporting walls 14d and 14e are formed at upper ends of the shaft portion 14a. The aforementioned torsion spring 16 is wound around the supporting walls 14d and 14e. Since a pair of slits 14f that extend in the axial direction are formed between the supporting walls 14d and 14e, and one of the walls 14d is thicker than the other supporting wall 14, the wound portion of the torsion spring 16 can easily be inserted between the supporting walls 14d and 14e by bending the thinner supporting wall 14e. A shutter opening-and-closing mechanism 14g is formed so as to rise upward from an end of one of the arms 14b. The mechanism 14g passes through the aforementioned clearance hole 12d and extends above the holder 12, so as to allow one end of the torsion spring 16 to be secured thereby. Further, a lock pawl 14h is formed at an end of the other arm 14c, and can engage or disengage from the retainer pawl 11c of the slide plate 11. The other end of the torsion spring 16 extends past the projection 12e of the holder 12, and has a bent portion 16a, being the bent end of the spring 16, which is retained in the retainer hole 12f.

Figure 22:
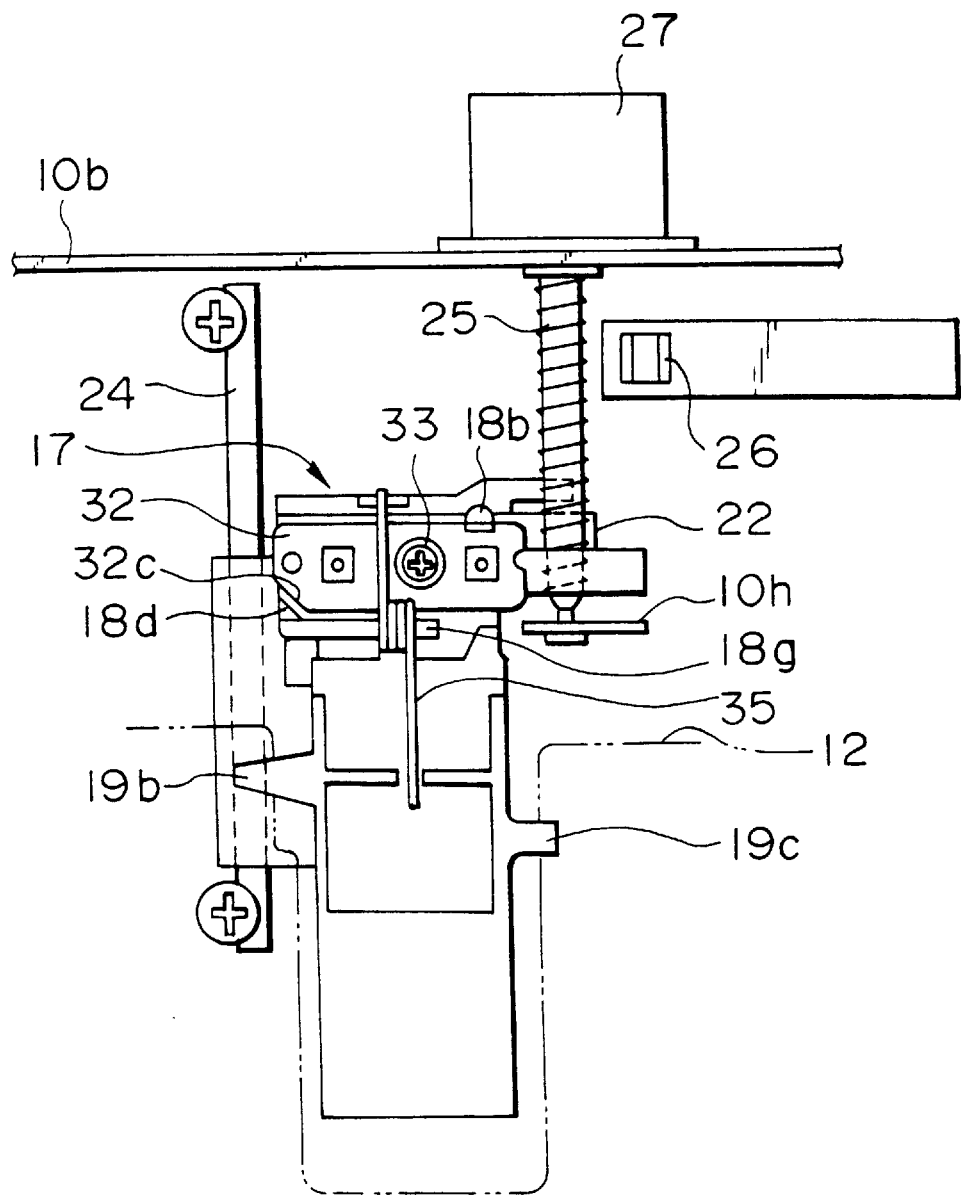
FIG. 22 is a plan view of a mechanism for moving the head provided in the magnetic recording/reproducing device.
Figure 23:
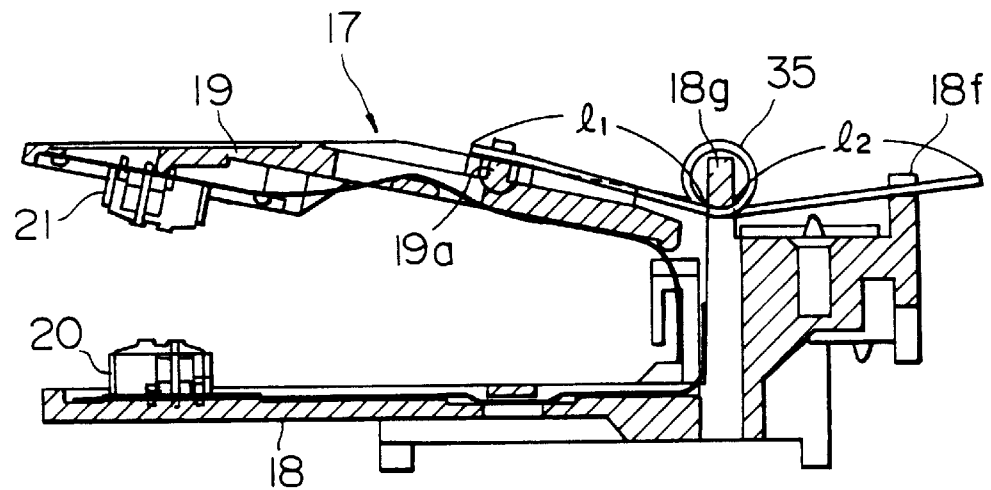
FIG. 23 is a cross sectional view of the mechanism for moving the head.
Figure 24:
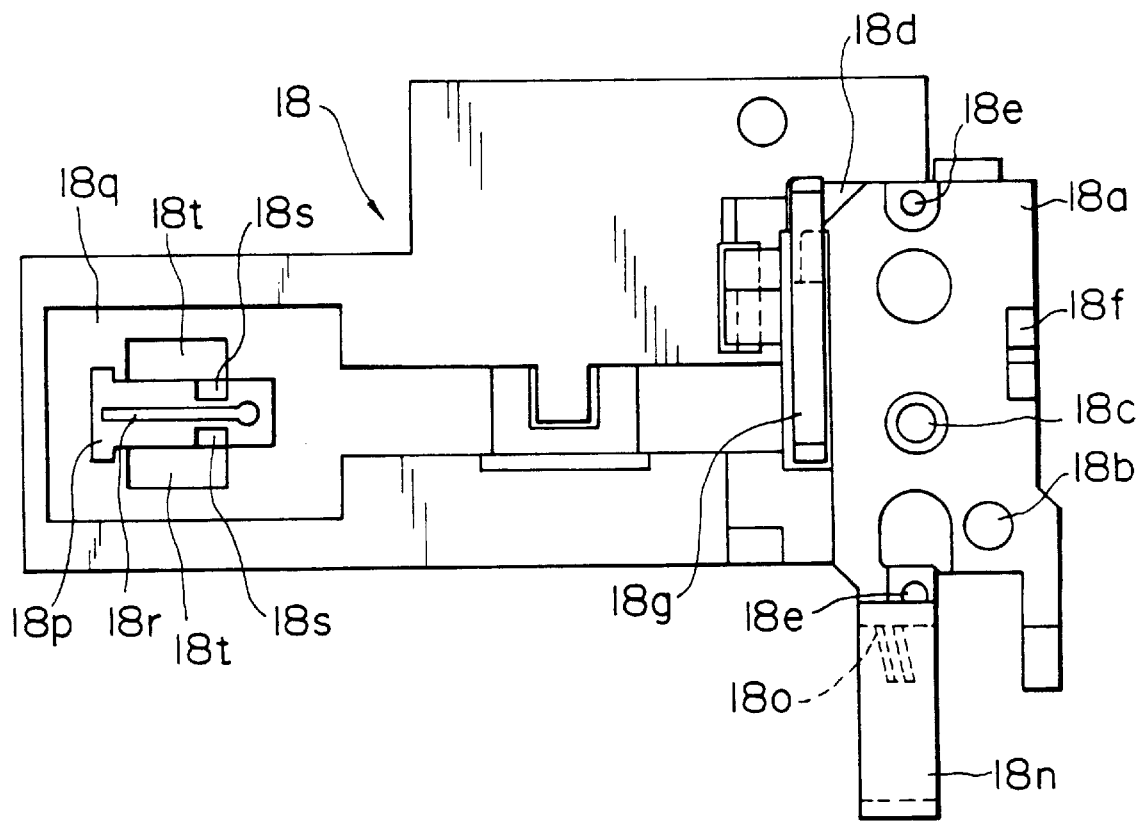
FIG. 24 is a plan view of the carriage mounted to the mechanism for moving the head.

A mechanism 17 for moving the head is disposed at the back portion of the chassis 10, and, as shown in FIGS. 22 and 23, comprises a carriage 18 and a hold case 19 hinged so as to be disposed above the carriage 18. The carriage 18 and the hold case 19 are both formed from plastic material. A lower magnetic head 20 is fixed onto the upper surface of the carriage 18, while an upper magnetic head 21 is fixed to the lower surface of the hold case 19.

Figure 25:
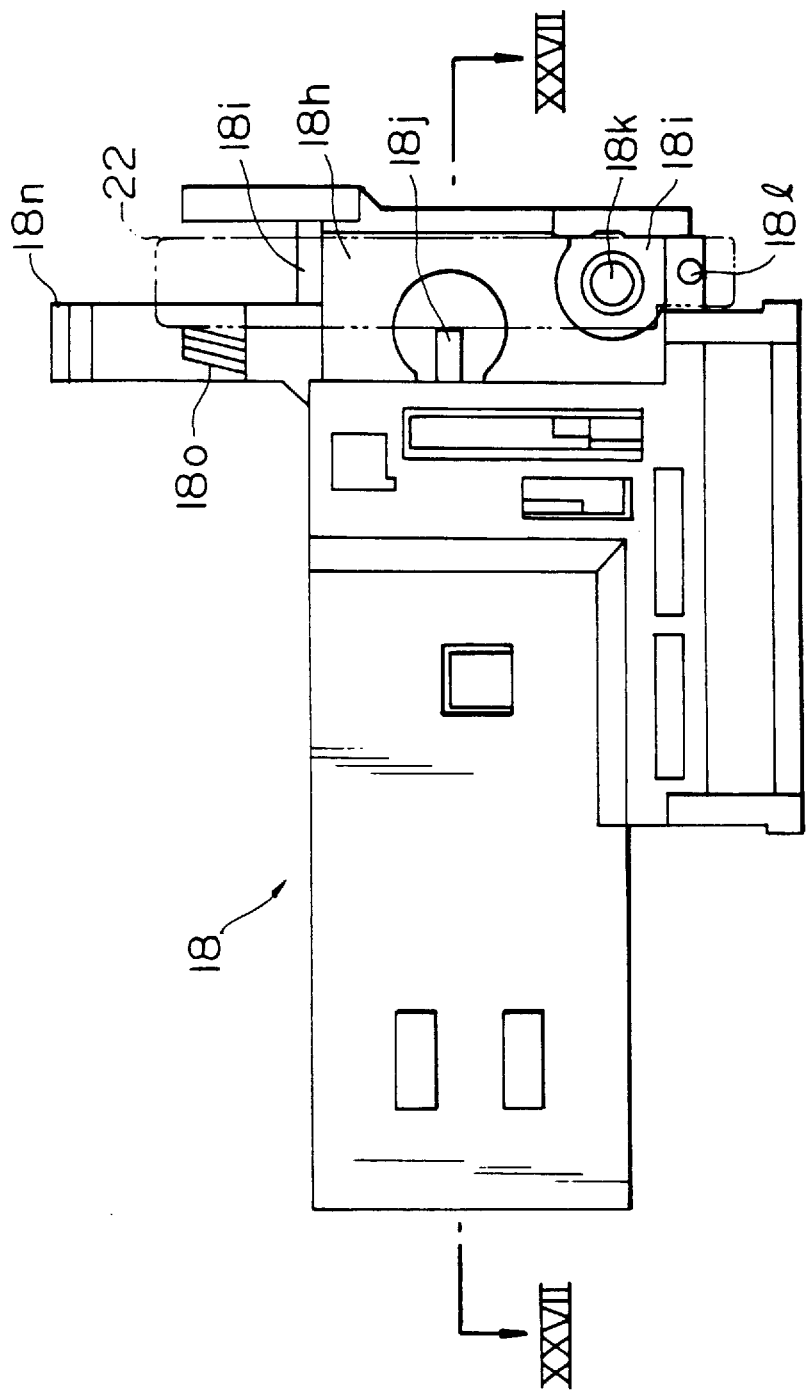
FIG. 25 is a view of the back side of the carriage.

As illustrated in FIGS. 24 to 27, a stepped connecting portion 18a is formed at the back portion of the carriage 18. A circular groove 18b, a tapped hole 18c, a limiting projection 18d, a pair of positioning pins 18e, a spring receiving portion 18f, and an L-shaped spring supporting portion 18g are formed at the upper surface of the connecting portion 18a. A recess 18h, a pair of supporting portions 18i, and a guide portion 18j are formed at the back side of the connecting portion 18a. The recess 18h has an open lower surface, the pair of supporting portions 18i face each other via the recess 18h, and the guide portion 18j slopes toward the recess 18h. One of the supporting portions 18i has a tapped hole 18k and a positioning pin 18l. The lower surfaces of the supporting portions 18i substantially form a same planar surface, and a follower spring 22, indicated by an alternate long and two short dashed lines in FIG. 25, is secured between the supporting portions 18i.

Figure 28:
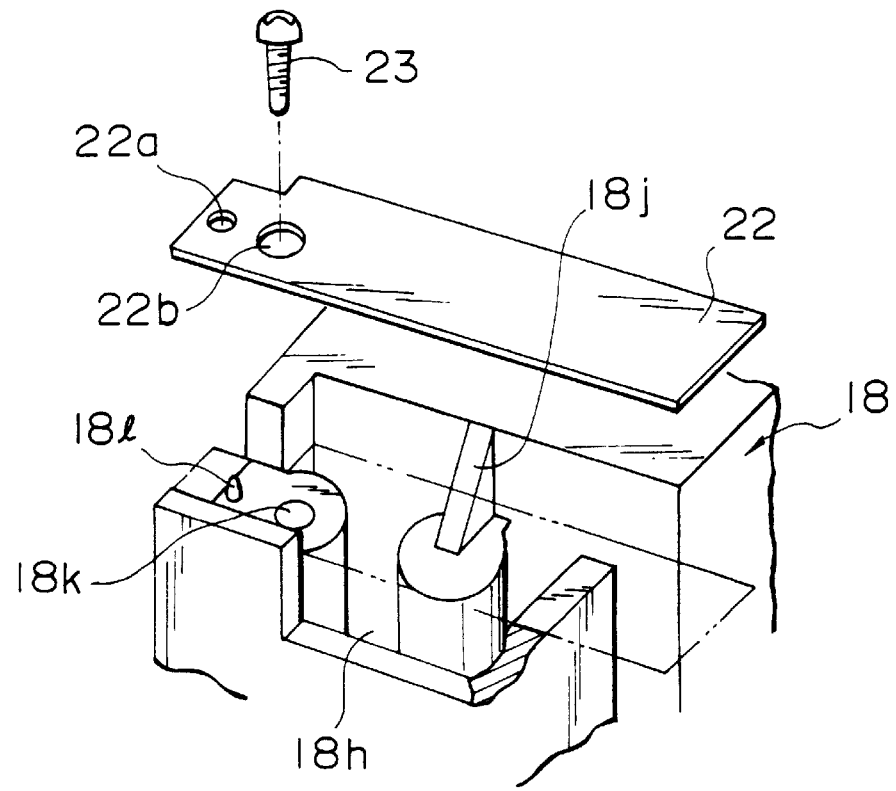
FIG. 28 is illustrative of the follower spring being mounted to the carriage.

When the follower spring 22 is being mounted, as illustrated in FIG. 28, with the carriage 18 turned upside down, the follower spring 22 is dropped onto both supporting portions 18i from the back side of the connecting portion 18a, with the carriage 18 kept upside down, and the positioning hole 22a in the follower spring 22 receives the positioning pin 18l. Thereafter, a screw 23 is inserted into a through hole 22a in the follower spring 22 and is screwed into the tapped hole 18k, as a result of which the follower spring 22 is secured to the back side of the connecting portion 18a of the carriage 18. Here, a guide portion 18j is formed in the open end of the recess 18h, so that the follower string 22 is always dropped onto each supporting portion 18i due to the guide portion 18j.

Referring back to FIGS. 22 to 27, a through hole 18m is formed in a side of the carriage 18. Inserting a guide shaft 24 fixed to the chassis 10 into the through hole 18m allows the carriage 18 to be guided back and forth with respect to the chassis 10. An L-shaped arm 18n is formed on the other side of the carriage 18. The arm 18n extends upwardly of a screw shaft 25 to a detecting portion 26, including a photointerpreter, disposed on the chassis 10. A protuberance 18o is formed at the back side of the L-shaped arm 18n. The follower spring 22 exerts an elastic force on the protuberance 18o so as to allow the protuberance 18o to engage the screw shaft 25, which is a rotating shaft of a stepping motor 27 mounted to the back upright wall 10b of the chassis 10. An end of the screw shaft 25 is supported by the supporting wall 10h of the chassis 10. Therefore, when the screw shaft 25, with the stepping motor 27 as driving source, rotates, the rotational force of the shaft 25 is transmitted to the carriage 18 via the protuberance 18o, causing the carriage 18 to move back and forth with respect to the chassis, that is to move in the radial direction of the magnetic disk 8. When an end of the L-shaped arm 18n moves across the detecting portion 26, a zero-track signal is output.

Figure 29:
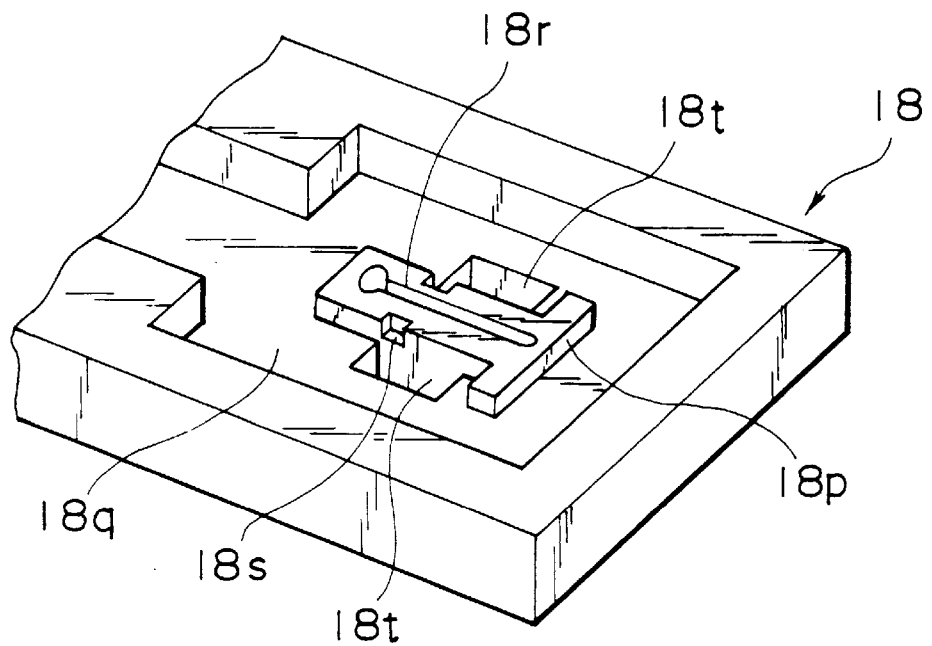
FIG. 29 is a perspective view of where a head is mounted to the carriage.
Figure 30:
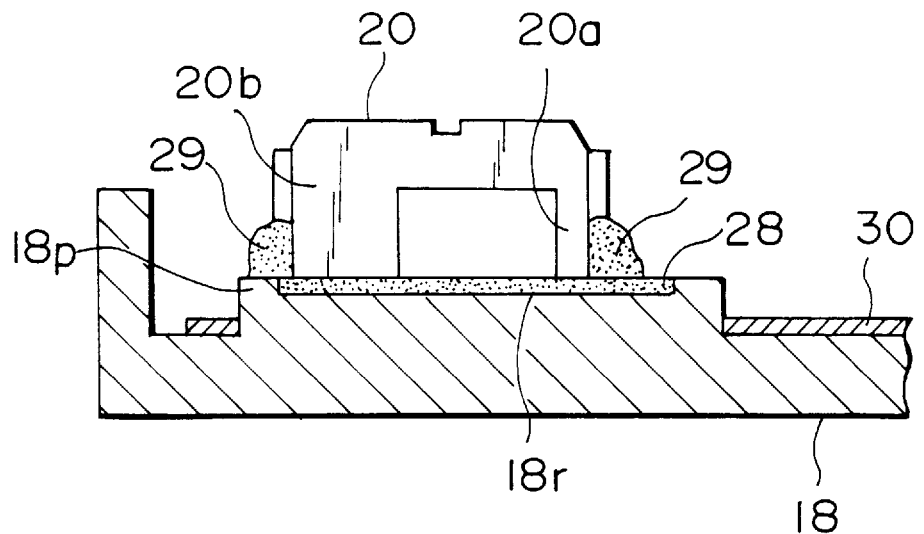
FIG. 30 is a cross sectional view of the carriage and the lower magnetic head in a mounted state, as viewed in the longitudinal direction.
Figure 31:
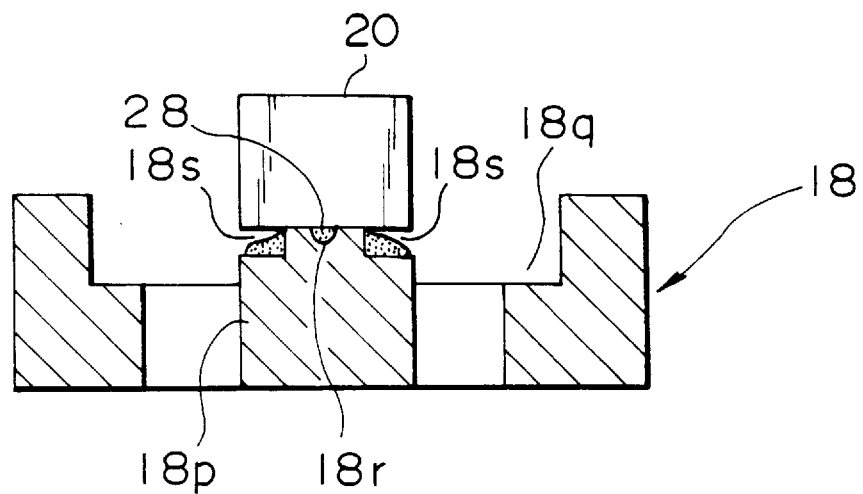
FIG. 31 is a cross sectional view, as viewed in the widthwise direction.

As illustrated in FIGS. 29 to 31, a mounting base 18p is formed at the central portion of an end of the carriage 18, with a cavity 18q formed around the mounting base 18p. An adhesive filling groove 18r and a relief 18s are formed in the top surface of the mounting base 18p. The groove 18r extends in the longitudinal direction of the chassis 18, and the groove 18s is in opposing relationship via the groove 18r. Through holes 18t are formed on both sides of the mounting base 18p. One end of the groove 18r is formed into a circular portion which is wider than the other end of the groove 18r. In fixing the lower magnetic head 20 to the mounting base 18p with the above-described construction, the head 20, placed on the mounting base 18p, is fixed thereto by the adhesive 28 in the adhesive filling groove 18r. In this case, the circular portion formed at one end of the adhesive filling groove 18r is disposed outwardly from the lower magnetic head 20, so that the adhesive 28 is unfailingly poured from the wider circular portion of the groove into the groove 4 between the lower magnetic head 20 and the mounting base 18p. The adhesive filling groove 18r extends along the central portion of the lower surface of the lower magnetic head 20, so that the lower magnetic head 20 is well balanced on the mounting base 18p when it is bonded therewith. The lower magnetic head 20 has a thin core portion 20 and a thick core portion 20b. The thin core portion 20a which is less rigid than the thick core portion 20b bestrides the adhesive filling groove 18r and is disposed above both reliefs 18s, so as to allow surplus adhesive 28 flowing out from the adhesive filling groove 18r and the lower surface of the lower magnetic head 20 to be collected in the reliefs 18s. Therefore, it is possible to prevent the thin core portion 20a from breaking due to the hardening of the adhesive 28, because the area of contact between the thin core portion 20a and the mounting base 18p is reduced.

After the lower magnetic head 20 has been bonded to the mounting base 18p with the adhesive 28, UV resin or other adhesives may be applied around the lower magnetic head 20, if necessary, in order to bond the lower magnetic head 20 more firmly to the mounting base 18p, as illustrated in FIG. 30. The lower magnetic head 20 bonded onto the mounting base 18p of the carriage 18 is connected to a flexible printed board (FPC), which is such as to be led through the cavity 18q to a printed board 37 (described later).

Figure 32:
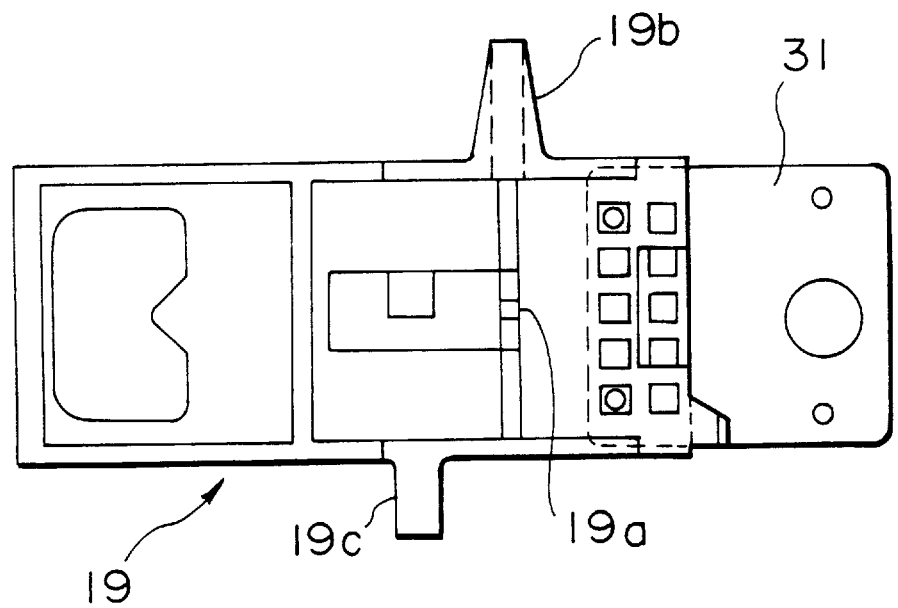
FIG. 32 is a plan view of the hold case of the mechanism for moving the head.

As illustrated in FIG. 32, a spring receiver portion 19a, and a first supporting arm 19b and a second supporting arm 19c are formed on the upper surface of the hold case 19, with the two arms projecting out from each side of the hold case 19. The lower surface of the first supporting arm 19b is disposed below the lower surface of the second supporting arm 19c. In the present embodiment, an L-shaped leaf hinge spring 31 is provided, downwardly of an end of the first supporting arm 19b. The leaf hinge spring 31 is integrally formed with the hold case 19 by out-sert molding. In addition, the aforementioned upper magnetic head 21 is fixed to an end of the holder case 19 via a gimbal spring, and is also led to the printed board 37 via the FPC (not shown).

Figure 26:
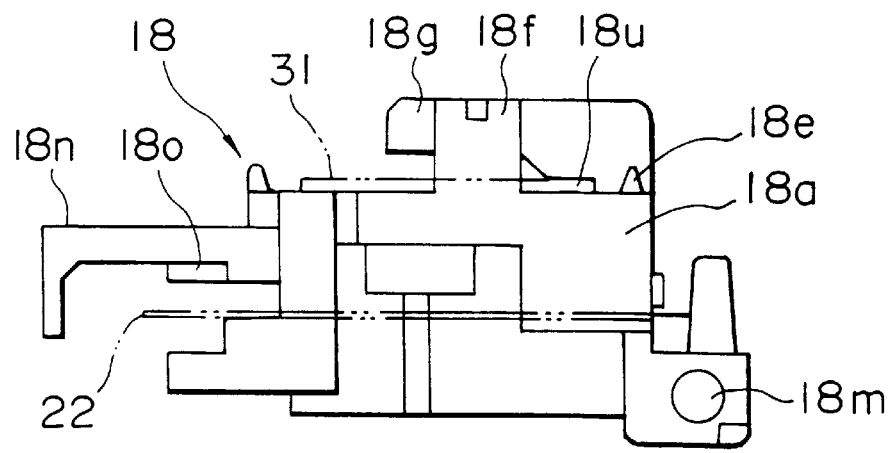
FIG. 26 is a rear elevational view of the carriage.
Figure 27:
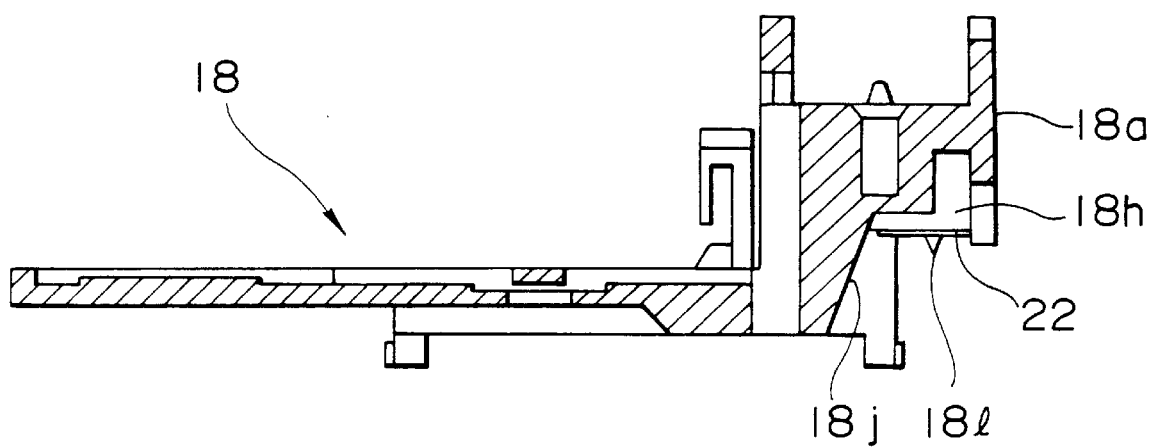
FIG. 27 is a cross sectional view taken along line XXVII—XXVII of FIG. 25.
Figure 33:
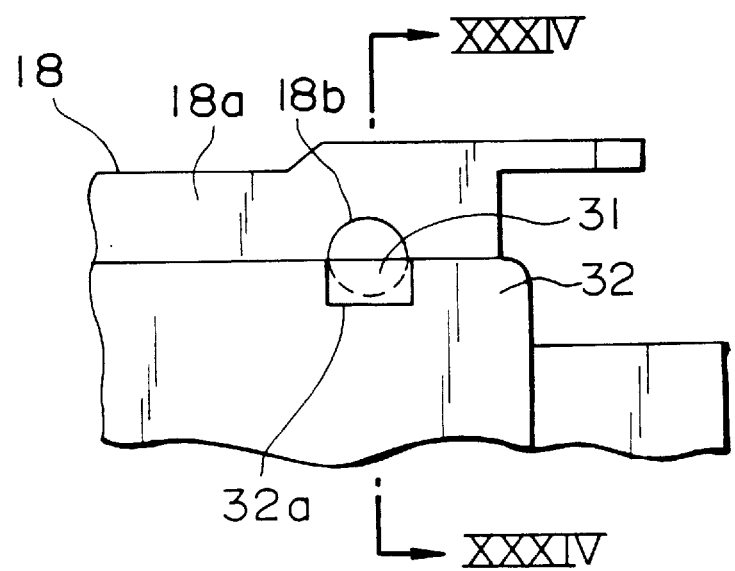
FIG. 33 is a plan view of a critical portion of the mounting location of the hold case and the carriage.
Figure 34:
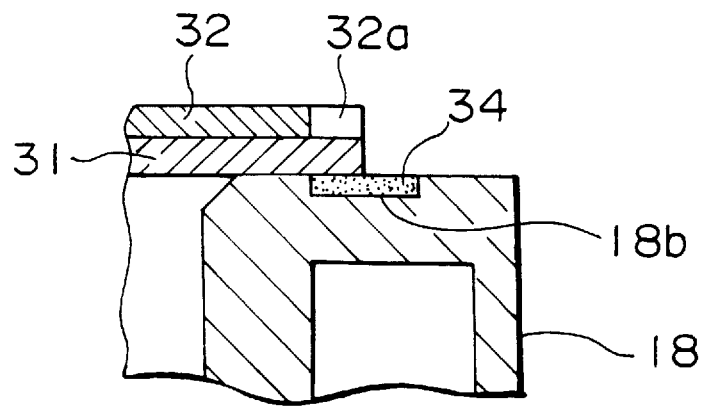
FIG. 34 is a cross sectional view taken along line XXXIV—XXXIV of FIG. 33.

As illustrated in FIGS. 22 and 23, the hold case 19 with such a construction is hinged onto the connecting portion 18a of the carriage 18 by placing the leaf hinge spring 31 and a mounting plate 32, which have been placed on top of each other, onto the connecting portion 18a of the carriage 18, and screwing a setscrew 33 into a tapped hole 18c in the connecting portion 18a from above the tapped hole 18c. In this case, as illustrated in FIG. 26, inserting a side edge of the leaf hinge spring 31 into a cutout 18u formed in a base of the spring supporting portion 18g of the carriage 18 in order to place the side edge onto the connecting portion 18a causes the spring supporting portion 18g to retain the side edge of the leaf hinge spring 31. With the side edge retained by the spring supporting portion 18g, after the hold case 19 has rotated slightly in opposition to the tightening force of the set screw 33 in order to align the lower magnetic head 20 and the upper magnetic head 21, the adhesive 34, filling the circular groove 18b in the carriage 18, temporarily affixes the leaf hinge spring 31 to the connecting portion 18a. In this case, as illustrated in FIGS. 33 and 34, the adhesive 34 can easily be poured between the carriage 18 and the leaf hinge spring 31 from an exposure portion of the circular groove 18b, because the leaf hinge spring 31 is placed on the connecting portion 18a so as to cover only about half of the circular groove 18b. In addition, a cutout 32a, formed in the mounting plate 32 placed on top of the leaf hinge spring 31, collects surplus adhesive 34, thereby preventing unwanted adhesive 34 from being squeezed out. After the temporary fixing, the leaf hinge spring 31 and the connecting portion 18a are permanently fixed together with the set screw 33. In this case, the leaf hinge spring 31 is temporarily affixed to the connecting portion with the adhesive 34 in order to maintain the alignment of the lower magnetic head 20 and the upper magnetic head 21.

The mounting plate 32 is formed by press-cutting a metallic blank sheet, during which burrs of ununiform heights are formed on one surface of the mounting plate 32. If the mounting plate 32 is placed on the connecting portion 18a of the carriage 18, with the surface with burrs reversed, the tightening force of the set screw 33 no longer acts uniformly on the leaf hinge spring 31. Accordingly, in the present embodiment, as shown in FIG. 22, directional properties are given to the mounting plate 32 by forming a cut portion 32c at a corner of the mounting plate 32 and positioning the limiting projection 18d of the carriage 18 within the cut portion 32c. Therefore, while the mounting plate 32 is placed on the connecting portion 18a of the carriage 18, the burrs always face upward, so that when the mounting plate 32 is reversed, it cannot be mounted to the carriage 18.

Referring back to FIG. 22, the wound portion of the load spring 35 receives the spring supporting portion 18g of the carriage 18, with both free ends of the spring 35 being secured by spring receiver portions 18f and 19a, respectively, so as to resiliently urge the hold case 19 toward the carriage 18. The aforementioned load spring 35 is a torsion spring, with length $l_1$ between the wound portion and one of the free ends being about the same as length $l_2$ between the wound portion and the other free end. For this reason, it no longer becomes necessary to worry about the direction which the load spring 35 faces, when being installed, thus resulting in improved workability. In addition, the hold case 19 is positioned in the slot 12c in the holder 12. Of the two supporting arms 19b and 19c of the hold case 19, the first supporting arm 19b, upon which is exerted the elastic force of the load spring 35, contacts the bulging portion 12b of the holder 12, with a predetermined clearance formed between the second supporting arm 19c and the bulging portion 12b. Here, the second supporting arm 19c is disposed further away from the leaf hinge spring 31 than the first supporting arm 19b, so that when a required clearance is provided between the second supporting arm 19c and the bulging portion 12b, the second supporting arm 19c can be made as thick as possible. In addition, the first supporting arm 19b contacts the bulging portion 12b of the holder 12 at a location almost directly above the guide shaft 24, and the mechanism 17 for moving the head is resiliently supported by means of the follower spring 22 at a location away from the guide shaft 24. Therefore, it is possible to prevent floating of the mechanism 17 for moving the head, including the carriage 18, even when the follower spring 22 has low resiliency.

Figure 35:
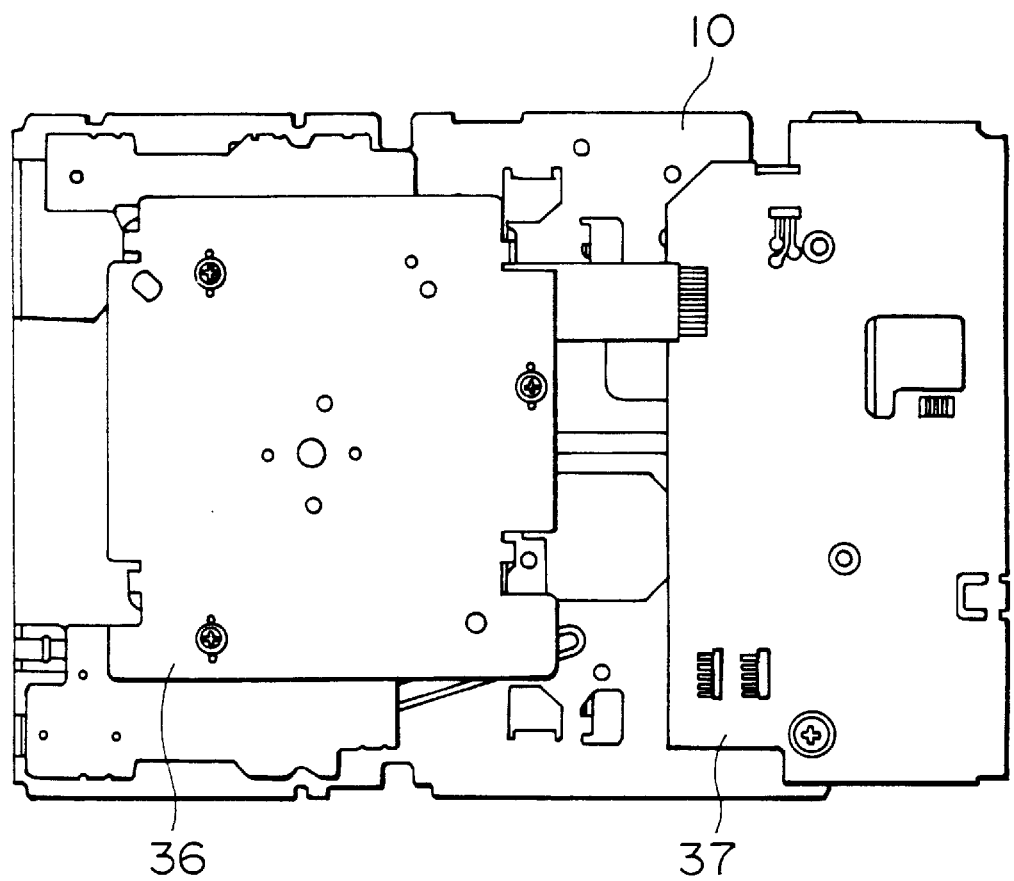
FIG. 35 illustrates the chassis of FIG. 13, as viewed from the back side thereof.

FIG. 35 illustrates the chassis as viewed from the back side, wherein a sub-chassis 36 and the aforementioned printed board 37 are fixed to the lower surface of the chassis 10. A spindle motor 38 is installed on the sub-chassis 36, as illustrated in FIG. 9, and is electrically connected to the printed board 37 via the control board, FPC, etc. A circuit device such as a circuit device for driving, for example, the aforementioned stepping motor 27 or the spindle motor 38, is mounted onto the printed board 37. In addition, as illustrated in FIG. 9, two connectors 39 and 40 are mounted onto the rear end of the upper surface of the printed board 37. The connectors 39 and 40 are male connectors with a plurality of connecting pins 39a and 40a, respectively. Inserting female connectors 41 of an external device, indicated by alternate long and two short dashed lines, into the connectors 39 and 40 results in connection of the magnetic recording/reproducing device to the external device.

Figure 36:
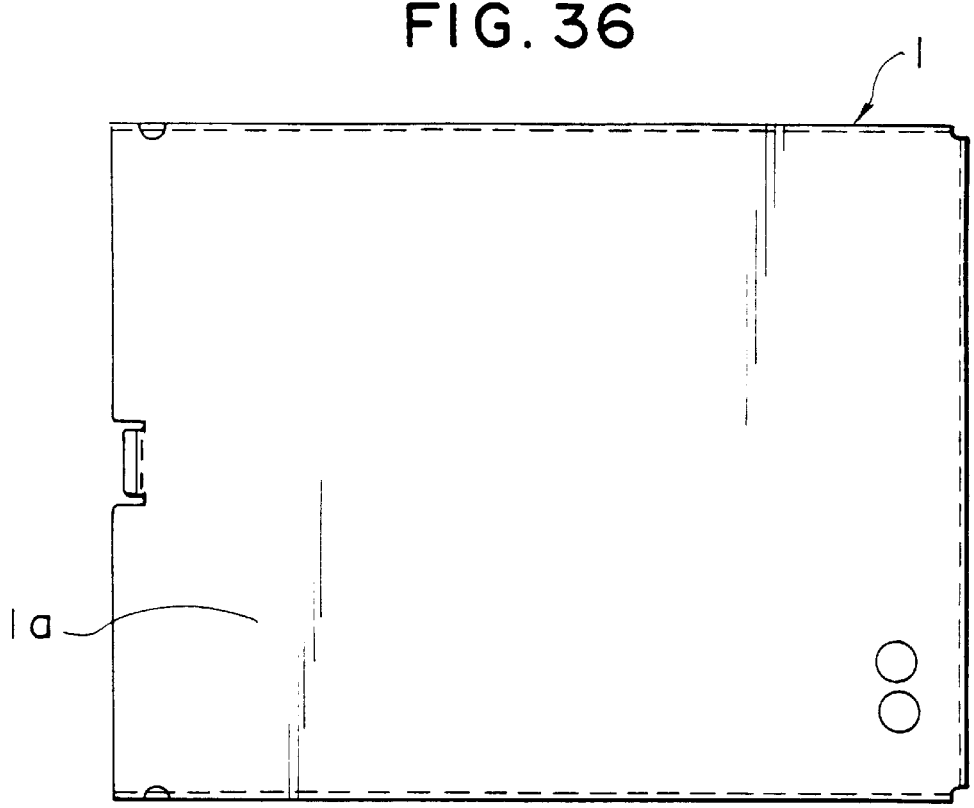
FIG. 36 is a plan view of the top cover of the magnetic recording/reproducing device.
Figure 37:
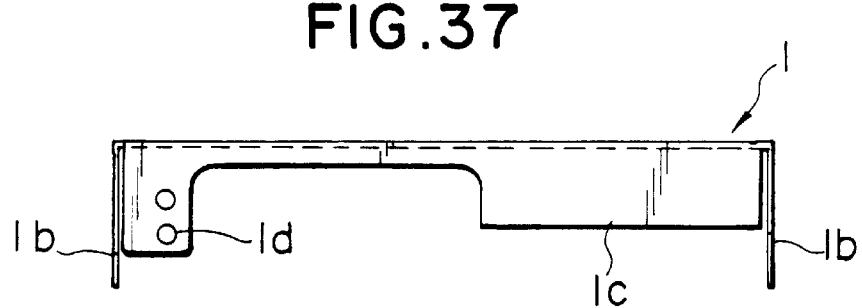
FIG. 37 is a rear elevational view of the top cover.
Figure 38:
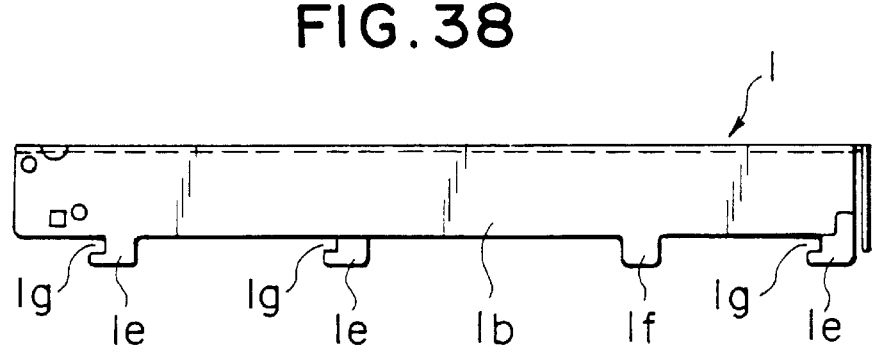
FIG. 38 is a side elevational view of the top cover.

As illustrated in FIGS. 36 to 38, the top cover 1 comprises a flat top face 1a, a pair of side faces 1b that extend vertically downward from the side edges of the top face 1a, and a back face 1c that extends vertically downward from the rear end of the top face 1a. The side faces 1b and the back face 1c are formed at right angles to the top face 1a as a result of bending portions of a base sheet. Through holes id are formed in the back face 1c. Two L-shaped leg portions 1e are formed on a lower end of one of the side faces 1b, while one L-shaped arm portion 1e and one square-shaped vertically, downwardly extending portion 1f are formed at a lower end of the other side face 1b. U-shaped cutouts 1g defined by the lower end of the side face 1b and an end of each of the leg portions 1e are formed, with each of the cutouts 1g formed at the same height. Each leg portion 1e and the vertically, downwardly extending portion 1f are not formed on each side face 1b, 1b at corresponding locations in the horizontal direction. That is, as illustrated in FIG. 38, they are not formed at corresponding locations on the top cover 1, as viewed in the horizontal direction, so that in producing a plurality of top covers 1 from the metal blank sheet, being the base sheet, the base sheet is press-cut so that the leg portions 1e or the vertically, downwardly extending portion 1f of a particular top cover 1 is positioned between the leg portions 1e or between the leg portion 1e and the vertically, downwardly extending portion 1f of another top cover 1, thereby minimizing the amount of scraps produced from the base sheet.

Figure 39:
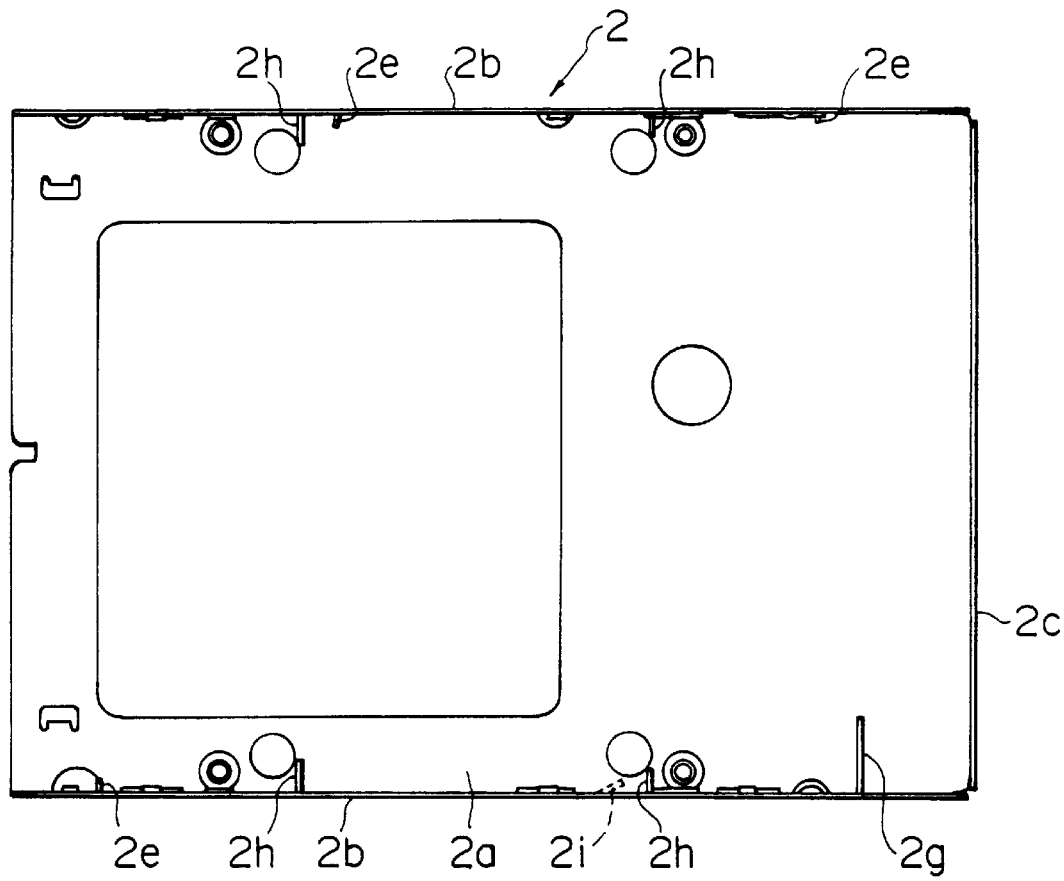
FIG. 39 is a plan view of the bottom cover of the magnetic recording/reproducing device.
Figure 40:
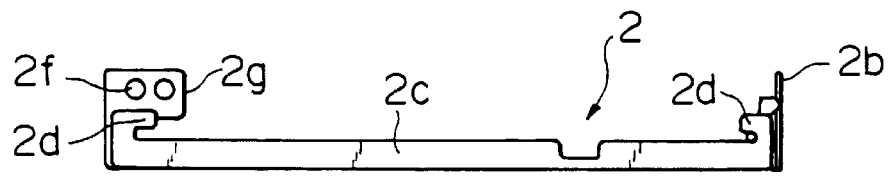
FIG. 40 is a rear elevational view of the bottom cover.
Figure 41:
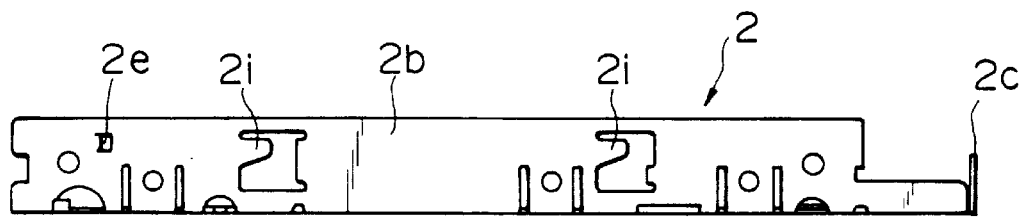
FIG. 41 is a side elevational view of the bottom cover.

As shown in FIGS. 39 to 41, the bottom cover 2 comprises a flat bottom face 1a, a pair of side faces 2b extending upright from both side edges of the bottom face 2a, and a back face 2c extending upright from a rear end of the bottom face 2a. The side faces 2b and the back face 2c are formed at right angles to the bottom face 2a by bending portions of the bottom cover 2. The front-to-back side dimension of the bottom face 2a of the bottom cover 2 is greater than that of the top face 2a of the top cover, so that the top cover 1 can be produced from a smaller amount of material in correspondence with the reduced dimension, and lighter in weight. In addition, the height of the back face 2c is sufficiently small with respect to the side faces 2b, and a pair of limiting walls 2d project out from an upper end of the back face 2c. Two retainer portions 2e are formed at one of the side faces 2b, while one retainer portion 2e and a portion 2g formed by bending and having through holes 2f are formed at the other side face 2b. The retainer portions 2e are formed by inwardly bending portions of the side faces along a vertical line substantially at right angles to the side face. Two sets of supporting portions 2h and stopper portions 2i are formed at each side face 2b, so that a total of four sets thereof are formed in the side faces 2b. The supporting portion 2h and the stopper portion 2i face each other via an opening. The supporting portion 2h and the stopper portion 2i of each set are vertically spaced apart, with the lower end of the stopper portion 2i upwardly inclined. Although the press-cut portion of the side face 2b to form the stopper portion 2i is not bent yet, the press-cut portion of the side face 2b to form the supporting portion 2h is bent inwardly along a vertical line at almost right angles.

Figure 6:
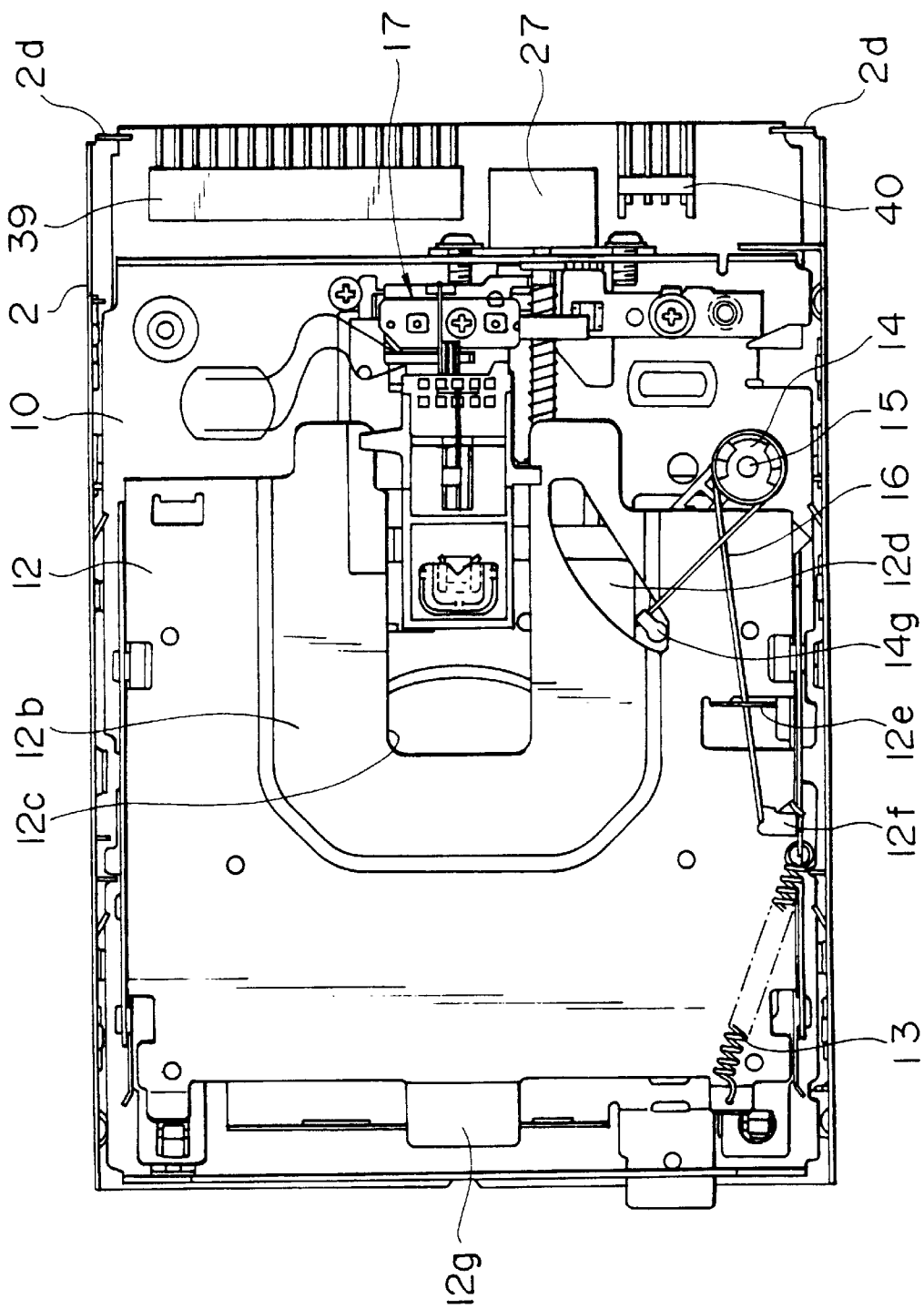
FIG. 6 is a plan view of FIG. 1 without the top cover.
Figure 7:
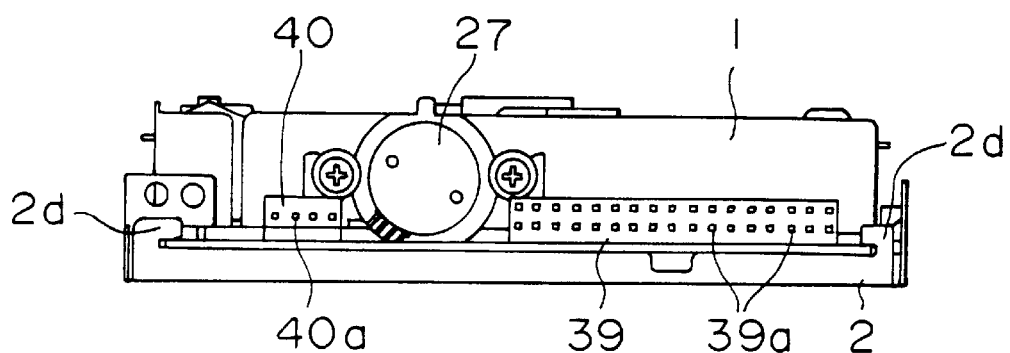
FIG. 7 is a rear elevational view thereof.
Figure 8:
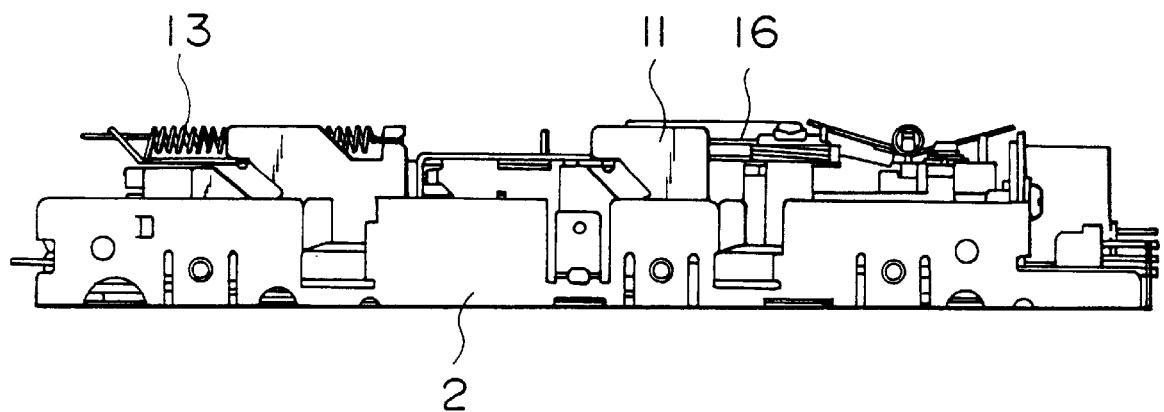
FIG. 8 is a side elevational view thereof.
Figure 42:
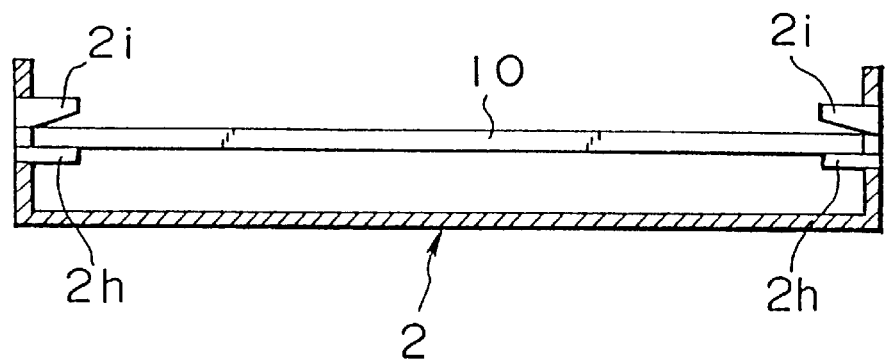
FIG. 42 is illustrative of the bottom cover in fixed relation to the chassis.

Upon fixing the mechanism body to the bottom cover 2 having the above-described construction, the top cover 1 is placed over the bottom cover 2 to integrally engage both of the covers 1 and 2, so as to form a housing for housing the magnetic recording/reproducing device. In this case, as shown in FIG. 42, the chassis 10 of an assembled mechanism body is inserted within the bottom cover 2 and placed on the supporting portions 2h. Then, portions of the side face 2b are inwardly bent at substantially right angles to form a set of stopper portion 2i and supporting portion 2h, by which the chassis 10 is clamped to the bottom cover 2. In this case, the stopper portion 2i and the supporting portion 2h of a set are formed within the region of an opening formed as a result of press-cutting with very high dimensional precision, so that the stopper portion 2i and the supporting portion 2h of each set are maintained at a constant height. Therefore, the chassis 10 can be mounted parallel to and on the bottom face 2a of the bottom cover 2, regardless of the bending angles of the stopper portion 2i and the supporting portion 2h. FIGS. 6 to 8 each illustrate the chassis 10 mounted in such a matter. As is clear from the figures, the limiting walls 2d of the bottom cover 2 are disposed on the sides of the connectors 39 and 40 mounted on the printed board 37.

Figure 43A:
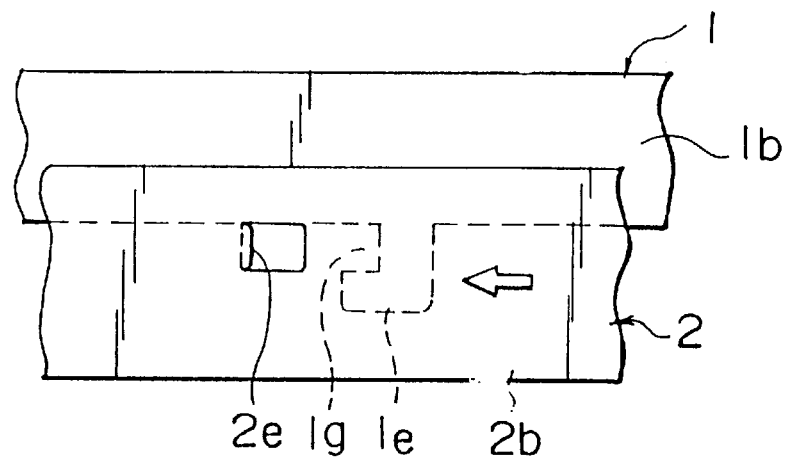
FIG. 43A and FIG. 43B are illustrative of the assembly process of the top and bottom covers.
Figure 43B:
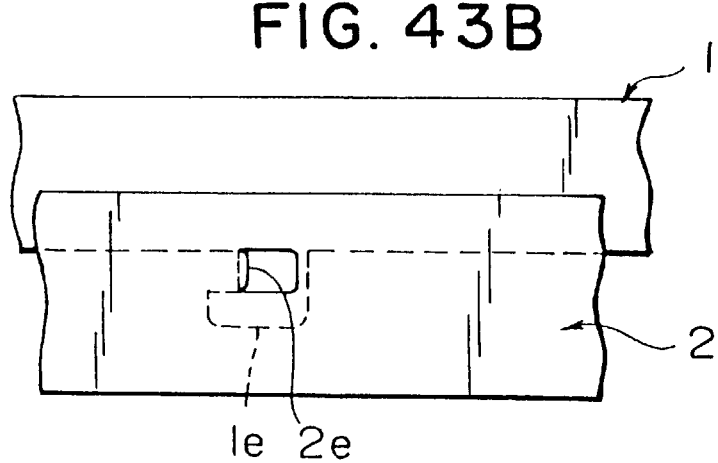
Figure 44:
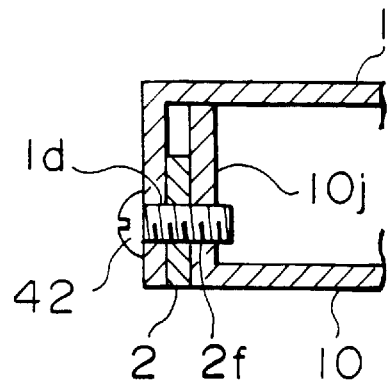
FIG. 44 is a cross sectional view of a critical portion of the fixing location of the top cover, the bottom cover, and the chassis.

As shown in FIG. 43(a), when the side faces 1b of the top cover 1 are inserted within the side faces 2b of the bottom cover 2, and the top cover 1 is pushed into the bottom cover 2 toward the rear end of the bottom cover 2 (in the direction of the arrow in FIG. 43(b)), the retainer portions 2e of the bottom cover 2 are pushed into their corresponding cutouts 1g in the leg portions 1e, as a result of which the top cover 1 engages the bottom cover 2. In this case, the cutouts 1g in the leg portions 1e and the retainer portions 2e that are retained in the cutouts 1g are formed by press-cutting portions of the base sheet making up the top cover 1 and the bottom cover 2, so that the cutouts 1g and the retainer portions 2e are formed with high dimensional precision. Accordingly, the leg portions are retained by their corresponding retainer portions 2e, regardless of the bending angles of the retainer portions. The openings formed as a result of press-cutting portions of the side faces 2b to form the retainer portions 2e are covered with the leg portions 1e, thus protecting the device from dust and magnetic effects. As shown in FIG. 44, inserting a screw 42 into through holes 1d and 2f of the top cover 1 and bottom cover 2, respectively, and screwing it in a tapped hole 10j in the chassis 10 integrally engages the mechanism body, including the chassis 10, the bottom cover 2, and the top cover 1.

FIGS. 1 to 4 illustrate the mechanism body, the bottom cover 2, and the top cover 1 in integral engagement. As is clear from the figures, a large portion of the mechanism body is covered by the upper and bottom covers 1 and 2, whereas the connectors 39 and 40 mounted on the printed board 37, and the stepping motor 26 mounted to the upright walls 10b of the chassis are exposed from the rear end of the top cover 1. The connectors 39 and 40, and the stepping motor 26 are disposed at an open portion located on the rear end of the bottom cover 2. In addition, as mentioned above, the limiting walls 2d formed at the back face 2c of the bottom cover 2 are disposed at the sides of the connectors 39 and 40. Therefore, the horizontal shifting of the female connectors 41, when being inserted into the connectors 39 and 40, is limited by the limiting walls 2d, thus allowing ready insertion of the female connectors 41 into the connectors 39 and 40. Further, when it becomes necessary to adjust the mounting position of the stepping motor 26, the wide space above the stepping motor 26 can be used for performing the adjustment.

A description will now be given of the operation of the magnetic recording/reproducing device of the present embodiment with the above-described construction.

Figure 45:
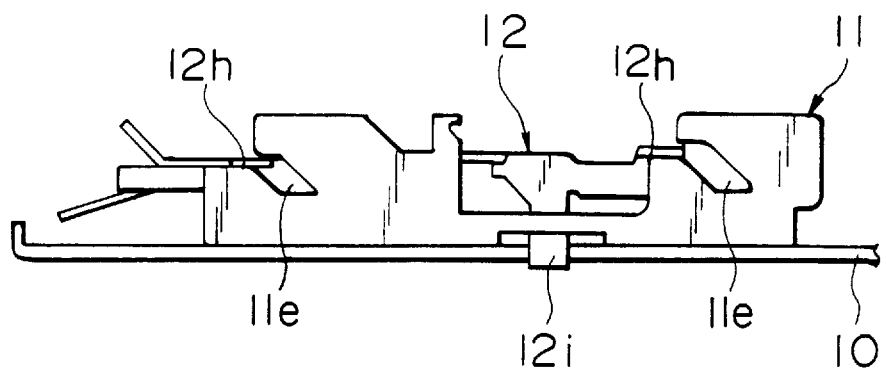
FIG. 45 is illustrative of the relationship between the holder and the slide plate, during unloading.

When the disk cartridge 6 is not mounted, the rotating member 14, being resiliently urged by the torsion spring 16, is positioned as illustrated in FIG. 6. When the lock pawl 14h of the rotating member 14 is retained by the retainer pawl 11c of the slide plate 11, the slide plate 11 is kept at the position where it retreats. In this case, as shown in FIG. 45, the projections 12 of the holder are retained by the upper ends of the cam grooves lie in order to maintain the holder 12 at the raised position.

When the disk cartridge 6 is inserted into the opening 3a in the front plate 3, the door 5 rotates due to the disk cartridge 6. The rotation of the door 5 is limited by contacting it with the stopper projection 12g of the holder 12, so as to prevent excessive door rotation. During insertion of the cartridge 6 into the opening 3a, wherein the cartridge 6 passes between the top face of the holder and the supporting portion 12a, and hits the shutter opening-closing pin 14g of the rotating member 14, the bent portion 16a of the torsion spring 16 is allowed to escape outwardly by means of the tapered portion 7a for preventing erroneous insertion of a disk cartridge. When the disk cartridge 6 is inserted erroneously with its front and back sides reversed, an end of the cartridge case 7 contacts the bent portion 16a in order to prevent further insertion of the disk cartridge 6.

Figure 47:
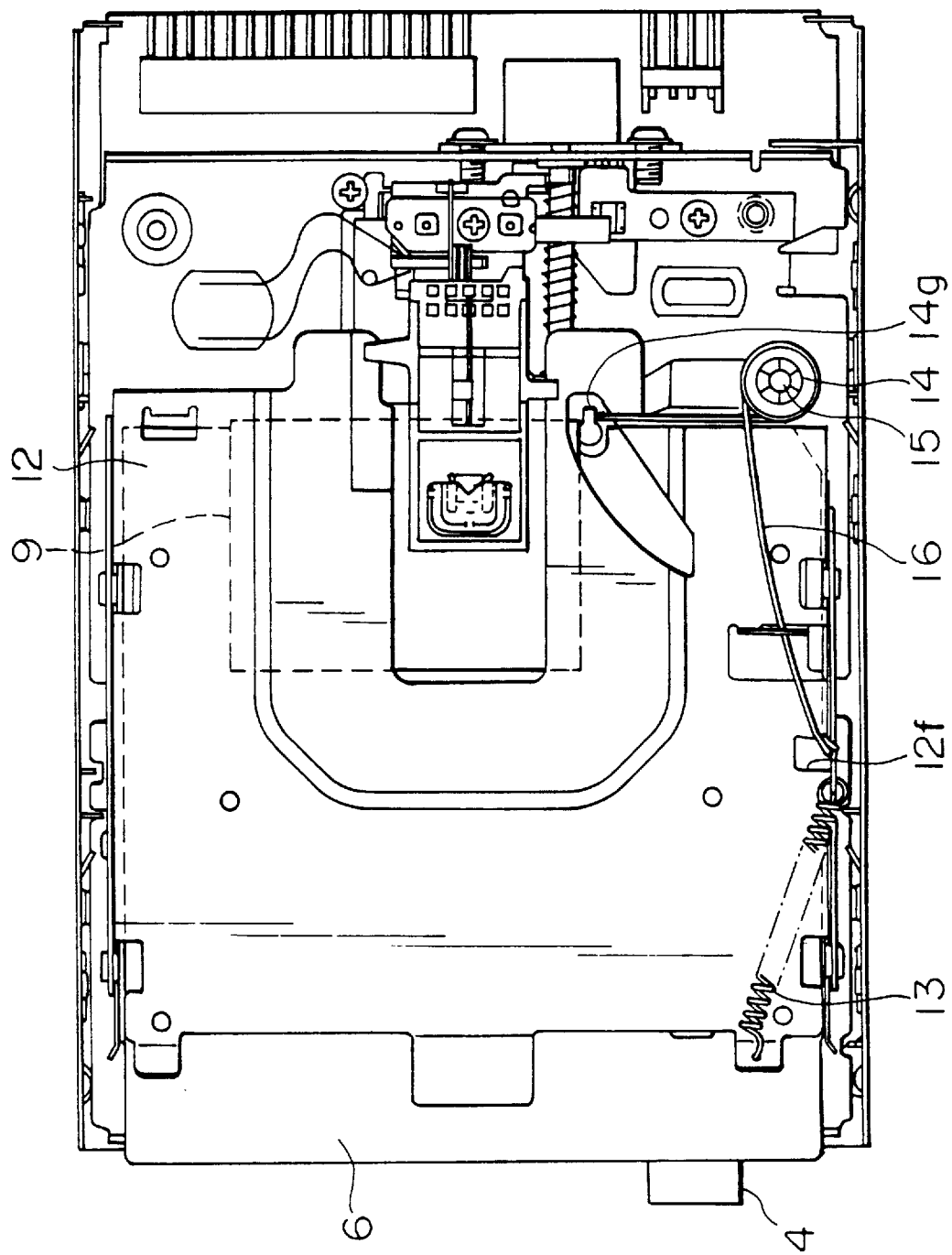
FIG. 47 is a plan view illustrating the loading state in FIG. 6.
Figure 48:
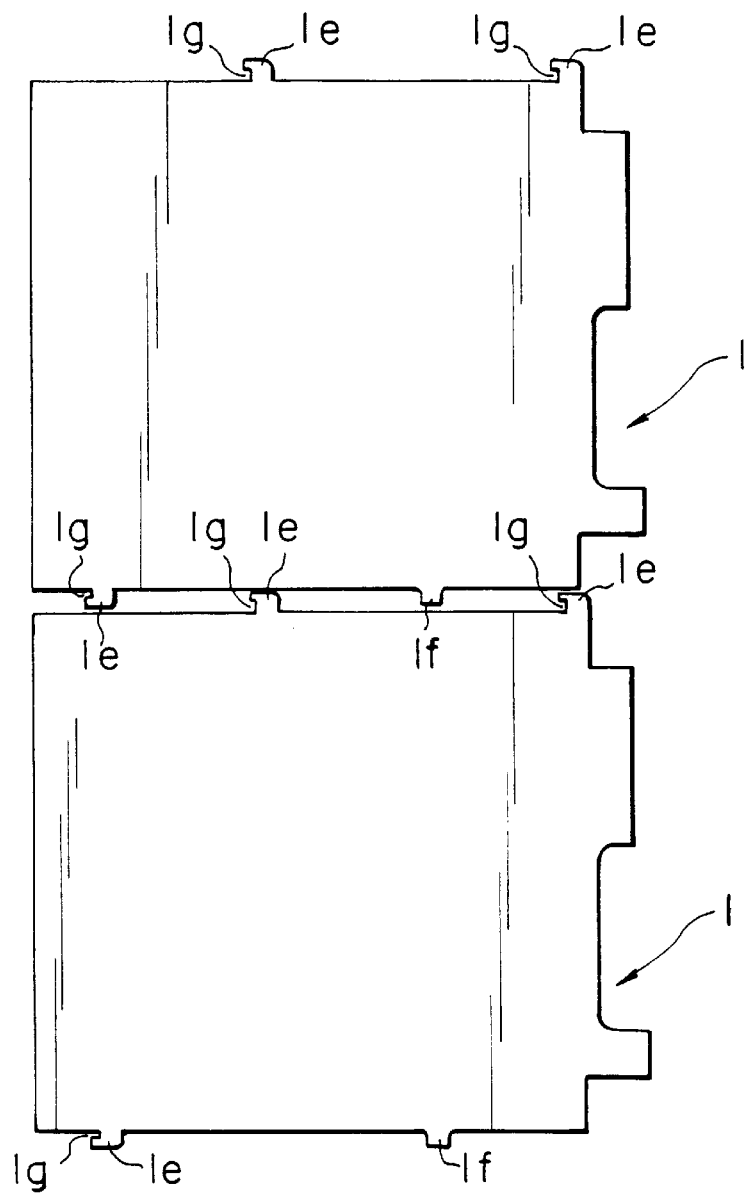
FIG. 48 is illustrative of the shapes of the top covers press-cut from a base sheet.

As shown in FIG. 47, when the disk cartridge 6 is inserted, the rotating member 14 opposes the resilient force of the torsion coil 16 and rotates clockwise, as viewed in FIG. 6, causing the end of the disk cartridge 6 to enter between the carriage 18 and the hold case 19, the carriage 18 having mounted thereto the mechanism 17 for moving the head. As the rotating member 14 rotates, the shutter opening-closing pin 14g rotates in the through hole 12d to move the shutter 9, whereby the magnetic disk 8 in the cartridge case 7 is exposed through the opening 7b and the window opening 9a. In addition, rotation of the rotating member 14 disengages the lock pawl 14h and the retainer pawl 11c, so that the slide plate 11 moves forwardly by means of the tension spring 13 to cause the eject button 4 fixed to the mounting portion 11b of the slide plate 11 to project out from the front plate 3. Consequently, as shown in FIG. 45, the projections 12h of the holder move toward the lower ends of the cam grooves 11e in the slider plate 11, as a result of which the holder 12, along with the disk cartridge 6, descends to a loading position. Since the first supporting arm 19b is in contact with the bulging portion 12b of the holder 12, as the holder 12 descends, the hold case 19, urged by the load spring 35, also descends, so that the lower magnetic head 20 mounted to the carriage 18 and the upper magnetic head 21 mounted to the hold case 19 both come into contact with the magnetic disk 8. Here, only the first supporting arm 19b comes into contact with the bulging portion 12b of the holder, with the opposing force thereof acting as torsional moment on the leaf hinge 31. As described above, one side edge of the leaf hinge spring 31 is supported in the cutout 18u in the spring supporting portion 18g, thus preventing deformation of the leaf hinge spring 31. If a large external force is exerted due to dropping or the like, the second supporting arm 19c of the hold case 19 comes into contact with the bulging portion 12b of the holder 12, so as to prevent the magnetic heads 20 and 21 from colliding and thus breaking.

Accordingly, after the disk cartridge 6 has descended to the loading position, driving of the stepping motor 27 produces rotation of the screw shaft 25, which is transmitted to the carriage 18 via the protuberance 18o, so as to move the mechanism 17 for moving the head along the guide shaft 24 in the radial direction of the magnetic disk 8. In addition, when the spindle motor 38 is driven causing rotation of the magnetic disk 8, the lower magnetic head 20 and the upper magnetic head 21 record information onto and reproduce information from the magnetic disk 8.

Figure 46:
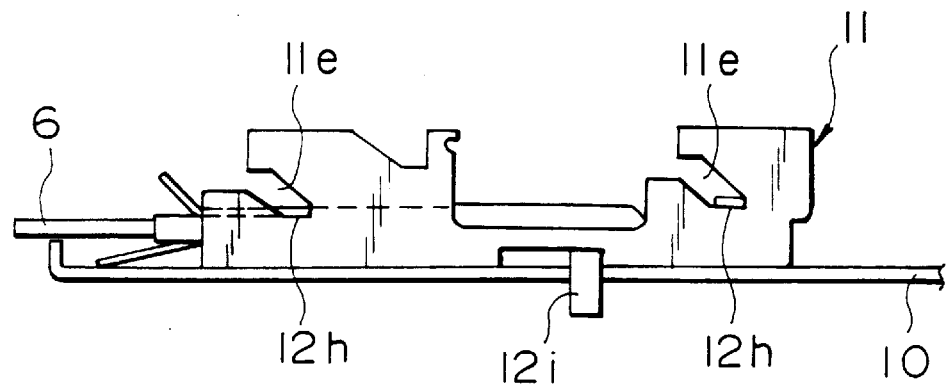
FIG. 46 is illustrative of the relationship between the holder and the slide plate, during loading.

When the disk cartridge 6 at the loading position is ejected, the eject button 4 projecting out from the front plate 3 is pressed, which causes the slide plate 11 to oppose the resilient force of the tension spring 13 and retreat. When this happens, the holder 12 moves upward from the loading position, indicated in FIG. 46, to the unloading position, indicated in FIG. 45. The rotating member 14, which rotates counterclockwise, as viewed in FIG. 47, causes ejection of the disk cartridge 6 from the opening in the front plate 3. When the lock pawl 14h of the rotating member 14 is retained by the retainer pawl 11c of the slide plate 11, the slide plate 11 is once again kept where it retreats.

Although in the present embodiment, the arm portion has been described as being formed on the top cover, and the retainer portion as being formed on the bottom cover, the retainer portion may be formed on the top cover, and the arm portion may be formed on the bottom cover.

Figure 49:
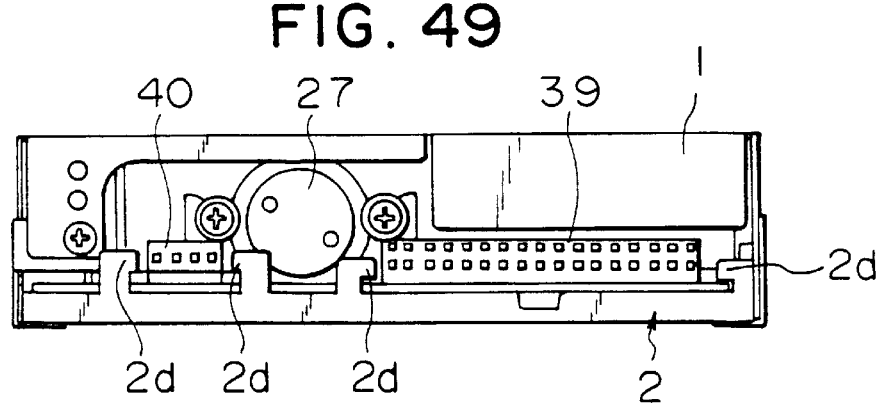
FIG. 49 is a rear elevational view of another embodiment of the magnetic recording/reproducing device in accordance with the present invention.
Figure 50:
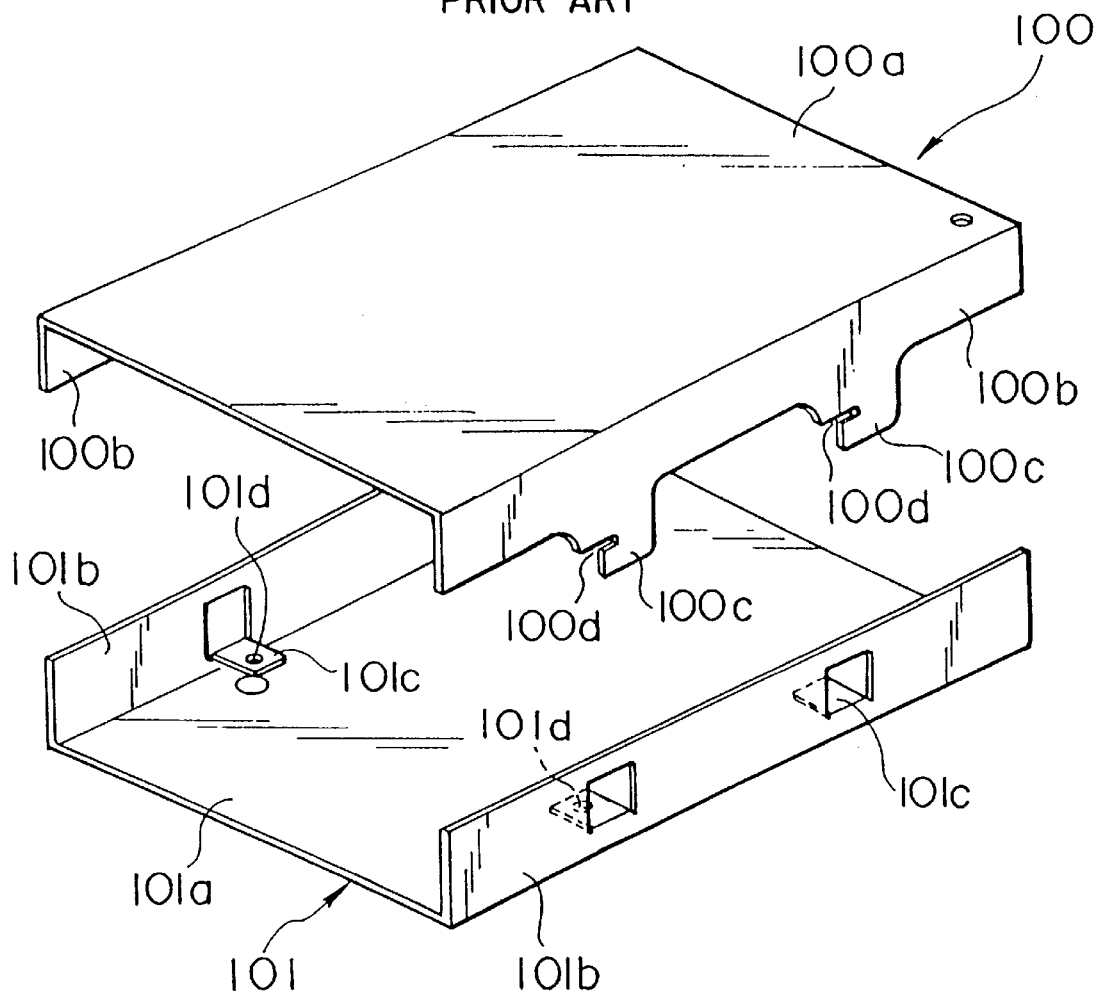
FIG. 50 is an exploded perspective view of the upper and bottom covers in a conventional magnetic recording/reproducing device.
Figure 51:
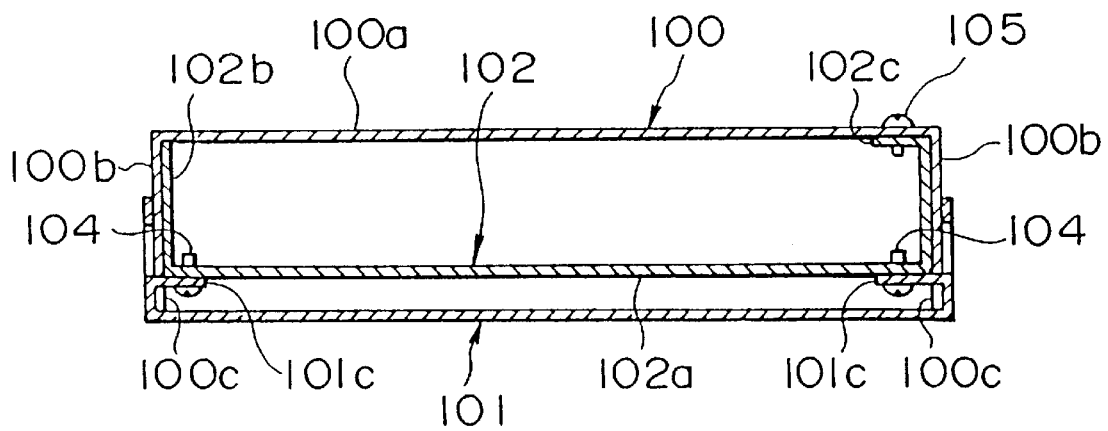
FIG. 51 is a cross sectional view of the chassis incorporated between the upper and bottom covers of FIG. 49.

In addition, the present invention is not limited to the foregoing embodiment. Various modifications may be made of, for example, the connectors 39 and 40 or the limiting walls 2*d*. For example, as shown in FIG. 49, the bottom cover may be provided with a larger number of limiting walls 2*d*, which are provided on both sides of each of the connectors 39 and 40. In such a case, it is possible to further prevent horizontal shifting of the female connector 41 of the external device.

As can be understood from the foregoing description, according to the present invention, a metal blank sheet is successively press-cut in order to form upper and bottom covers having arm portions that project out from each side face thereof, such that an arm portion of a side face of a particular cover is formed between the arm portions of a side face of a different cover which is adjacent thereto. Therefore, the press-cut portion between the leg portions, that are usually thrown away as scraps, can be used to form a leg portion of another upper or bottom cover, thus making it possible to produce a magnetic recording/reproducing device at a reduced cost.

In addition, according to the present invention, the retainer portion, formed by inwardly bending a portion of a side face along a vertical line, is clamped vertically by the sides defining the cutout in the leg portion, so that the position of each retainer portion relative to its corresponding cutout is maintained, regardless of the accuracy of the bending angle of the retainer portion, thus providing a magnetic recording/reproducing device in which the top and bottom covers can be engaged easily.

Further, according to the present invention, each of the supporting portion and stopper portion of a set, formed within the region of an opening as a result of press-cutting in a side face, is formed by inwardly bending a portion of the side face along a vertical line in order to clamp the chassis by a plurality of sets of the supporting portion and the stopper portion, thus minimizing variations in the relative positions of the supporting portion and the stopper portion of each set, and thus allowing accurate engagement of the chassis with the bottom cover.

Still further, according to the present invention, the top cover, bottom cover, and the chassis are placed upon each other, and are brought into engagement at one location, using one screw which is screwed tightly at the location of engagement, thus reducing the number of required component parts, and manhour.

Still further, according to the present invention, not only is the magnetic recording/reproducing device made lighter in weight and produced by a reduced amount of material corresponding to the reduced dimension of the top cover compared with the bottom cover, but also horizontal movement of the external connector, being connected to the connectors of the device, is limited by the restricting walls formed at the rear end of the bottom cover, so that the external connector can easily be connected to the connector of the device. In addition, when a motor, being a driving source of a mechanism for driving the head, is exposed, along with the connector, through the open portion disposed upwardly of the rear end of the bottom cover, motor adjustment can be carried out easily. When a plurality of limiting walls are formed on each side of the connector, horizontal shifting of the external connector can be further prevented.

What is claimed is:

1. A magnetic recording/reproducing device comprising:
    a pair of top and bottom covers that integrally engage each other to form an enclosure;
    a mechanism body accommodated in said top cover and said bottom cover;
    a printed board having mounted thereon a circuit component part for driving said mechanism body or a connector; and
    a motor serving as a driving source of a mechanism for moving a head, said motor being exposed through the opening along with the connector:
    wherein said top cover has a smaller front-to-back side dimension than said bottom cover in order to form an opening above a rear end of said bottom cover so as to expose the connector through the opening, the rear end of said bottom cover having formed thereon a limiting wall for limiting the horizontal movement of an external connector to be connected to the connector.

2. A magnetic recording/reproducing device according to claim 1, wherein the limiting wall is formed on the left and right sides of the connector so as to oppose each other.

* * * * *